United States Patent
Walk et al.

(10) Patent No.: US 12,155,519 B2
(45) Date of Patent: Nov. 26, 2024

(54) SYSTEMS AND METHODS FOR COMMUNICATING BY MODULATING DATA ON ZEROS

(71) Applicants: California Institute of Technology, Pasadena, CA (US); MOXZ GmbH, Berlin (DE)

(72) Inventors: Philipp Walk, Pasadena, CA (US); Babak Hassibi, San Marino, CA (US); Peter Jung, Berlin (DE)

(73) Assignees: California Institute of Technology, Pasadena, CA (US); MOXZ GmbH, Berlin (DE)

( * ) Notice: Subject to any disclaimer, the term of this patent is extended or adjusted under 35 U.S.C. 154(b) by 0 days.

(21) Appl. No.: 18/357,064

(22) Filed: Jul. 21, 2023

(65) Prior Publication Data
US 2023/0379203 A1   Nov. 23, 2023

Related U.S. Application Data

(63) Continuation of application No. 17/805,207, filed on Jun. 2, 2022, now Pat. No. 11,711,253, which is a
(Continued)

(51) Int. Cl.
*H04L 27/26* (2006.01)
*H04J 11/00* (2006.01)
*H04L 25/02* (2006.01)

(52) U.S. Cl.
CPC .......... *H04L 27/2627* (2013.01); *H04J 11/00* (2013.01); *H04L 25/0204* (2013.01);
(Continued)

(58) Field of Classification Search
CPC ..... H04B 7/0452; H04B 1/0475; H04L 7/042; H04L 7/048; H04L 27/2627;
(Continued)

(56) References Cited

U.S. PATENT DOCUMENTS 3,550,124 A * 12/1970 Heft .................. G01S 13/22
340/870.18
3,683,162 A * 8/1972 Jacob ................ H04Q 1/4575
708/517
(Continued)

FOREIGN PATENT DOCUMENTS

CN    104683279 A    6/2015
CN    107181706 A    9/2017
(Continued)

OTHER PUBLICATIONS

Extended European Search Report for European Application No. 19743639.7, Search completed Aug. 31, 2021, dated Sep. 8, 2021, 8 Pgs.
(Continued)

*Primary Examiner* — James M Perez
(74) *Attorney, Agent, or Firm* — KPPB LLP

(57) ABSTRACT

Systems and methods for transmitting data using various Modulation on Zeros schemes are described. In many embodiments, a communication system is utilized that includes a transmitter having a modulator that modulates a plurality of information bits to encode the bits in the zeros of the z-transform of a discrete-time baseband signal. In addition, the communication system includes a receiver having a decoder configured to decode a plurality of bits of information from the samples of a received signal by: determining a plurality of zeros of a z-transform of a received discrete-time baseband signal based upon samples from a received continuous-time signal, identifying zeros that encode the plurality of information bits, and outputting a plurality of decoded information bits based upon the identified zeros.

19 Claims, 17 Drawing Sheets
(12 of 17 Drawing Sheet(s) Filed in Color)

Related U.S. Application Data continuation of application No. 17/202,221, filed on Mar. 15, 2021, now Pat. No. 11,362,874, which is a continuation of application No. 17/009,696, filed on Sep. 1, 2020, now Pat. No. 10,992,507, which is a continuation of application No. 16/260,059, filed on Jan. 28, 2019, now Pat. No. 10,797,926.

(60) Provisional application No. 62/622,673, filed on Jan. 26, 2018.

(52) U.S. Cl.
CPC .... *H04L 27/2639* (2013.01); *H04L 27/26532* (2021.01); *H04L 27/2663* (2013.01); *H04J 2011/0096* (2013.01)

(58) Field of Classification Search
CPC ............. H04L 27/2639; H04L 27/2649; H04L 27/2663; H04L 49/55–557; H04L 25/0204; H04L 2209/00; H04L 2209/34; H04L 1/004; H04L 1/0041–0048; H04L 1/005; H04L 1/0051–0059; H04L 1/006; H04L 1/0061–0069; H04L 1/007; H04L 1/0071–0078; H04J 11/00
See application file for complete search history.

(56) References Cited

U.S. PATENT DOCUMENTS

| | | | | |
|---|---|---|---|---|
| 3,946,384 A * | 3/1976 | Westaway | G01S 13/02 342/60 |
| 4,071,906 A * | 1/1978 | Buss | G06F 17/15 708/421 |
| 4,095,225 A * | 6/1978 | Erikmats | G01S 13/288 342/195 |
| 4,382,160 A * | 5/1983 | Gosling | G10L 25/00 704/214 |
| 4,458,246 A * | 7/1984 | Filipsson | G01S 13/06 342/158 |
| 4,733,238 A * | 3/1988 | Fiden | G01S 7/006 342/60 |
| 4,736,663 A * | 4/1988 | Wawrzynek | G10H 5/007 84/DIG. 9 |
| 4,743,910 A * | 5/1988 | Hill | G01S 13/584 342/201 |
| 4,797,923 A * | 1/1989 | Clarke | H04L 27/26 324/76.12 |
| 4,802,222 A * | 1/1989 | Weaver | H03G 7/007 375/240 |
| 5,073,907 A * | 12/1991 | Thomas, Jr. | H03L 7/0991 331/1 R |
| 5,077,760 A * | 12/1991 | Lepage | H03M 7/40 358/409 |
| 5,337,266 A * | 8/1994 | Arnold | G06F 7/4833 708/517 |
| 5,732,113 A * | 3/1998 | Schmidl | H04L 27/2675 375/354 |
| 6,069,535 A | 5/2000 | Khlat | |
| 6,300,903 B1 * | 10/2001 | Richards | H04B 1/7183 342/450 |
| 6,373,859 B1 * | 4/2002 | Jedwab | H04L 25/4908 370/479 |
| 6,693,580 B1 * | 2/2004 | Wehling | G01S 13/87 342/45 |
| 6,850,562 B1 * | 2/2005 | Dornstetter | H04L 25/03159 375/229 |
| 6,853,726 B1 * | 2/2005 | Moskowitz | G06T 1/0028 380/45 |
| 7,243,294 B1 * | 7/2007 | Divsalar | H03M 13/258 714/755 |
| 7,245,250 B1 * | 7/2007 | Kalayeh | G01S 13/9017 342/25 R |
| 7,248,632 B1 * | 7/2007 | Mckenzie | H04N 19/124 375/E7.176 |
| 7,307,565 B1 * | 12/2007 | Melanson | H03M 7/3006 341/143 |
| 7,616,701 B2 * | 11/2009 | Ungerboeck | H04L 25/03343 375/295 |
| 7,769,105 B1 * | 8/2010 | McIntire | G01S 7/006 375/309 |
| 8,135,082 B2 * | 3/2012 | Choi | H04L 1/0041 375/264 |
| 8,249,129 B2 * | 8/2012 | Fudge | G01S 13/0209 375/135 |
| 8,884,782 B2 * | 11/2014 | Rubin | H04W 74/0816 340/436 |
| 9,215,114 B2 * | 12/2015 | Emami-Neyestanak | H03F 1/08 |
| 9,350,590 B2 * | 5/2016 | Ganesan | H04L 27/2613 |
| 9,503,303 B2 * | 11/2016 | Lee | H04L 27/3438 |
| 9,705,723 B2 * | 7/2017 | Kim | H04L 5/005 |
| 9,780,525 B2 * | 10/2017 | Arsenijevic | H01S 5/06223 |
| 9,825,674 B1 * | 11/2017 | Leabman | H04B 5/79 |
| 9,837,990 B1 * | 12/2017 | Pagnanelli | H03M 3/468 |
| 10,014,948 B2 * | 7/2018 | Ashrafi | H04B 10/1143 |
| 10,797,926 B2 * | 10/2020 | Walk | H04L 27/2627 |
| 10,804,982 B2 * | 10/2020 | Walk | H04B 7/0452 |
| 10,992,353 B2 * | 4/2021 | Walk | H04L 27/2676 |
| 10,992,507 B2 * | 4/2021 | Walk | H04L 25/0204 |
| 11,288,895 B2 * | 3/2022 | Chandel | G06V 40/172 |
| 11,362,874 B2 * | 6/2022 | Walk | H04L 27/2663 |
| 11,368,196 B2 * | 6/2022 | Walk | H04L 7/048 |
| 11,711,253 B2 * | 7/2023 | Walk | H04L 27/2663 375/260 |
| 11,799,704 B2 * | 10/2023 | Walk | H04L 27/2602 |
| 2001/0001008 A1 * | 5/2001 | Dent | H04L 25/03292 375/350 |
| 2002/0053062 A1 * | 5/2002 | Szymanski | H03M 13/6575 714/801 |
| 2003/0023584 A1 * | 1/2003 | Brandin | G06F 16/258 707/E17.118 |
| 2003/0156054 A1 * | 8/2003 | Ishii | G01S 7/003 342/111 |
| 2004/0004565 A1 * | 1/2004 | Melanson | H03M 7/3006 341/143 |
| 2004/0151142 A1 * | 8/2004 | Li | H04L 7/042 370/335 |
| 2004/0160353 A1 * | 8/2004 | Cirillo | H03M 7/30 342/25 R |
| 2005/0041746 A1 * | 2/2005 | Rosen | H04B 1/7163 375/242 |
| 2005/0100076 A1 * | 5/2005 | Gazdzinski | H04B 1/7176 375/242 |
| 2006/0045197 A1 * | 3/2006 | Ungerboeck | H03M 13/11 375/261 |
| 2006/0221810 A1 * | 10/2006 | Vrcelj | H04L 27/2656 370/208 |
| 2007/0014331 A1 * | 1/2007 | Eldon | H04N 19/63 375/E7.04 |
| 2007/0014332 A1 * | 1/2007 | Santhoff | H04B 1/7163 375/E7.073 |
| 2007/0086539 A1 * | 4/2007 | Hocevar | H04L 1/0068 375/267 |
| 2007/0089019 A1 * | 4/2007 | Tang | H03M 13/1102 714/752 |
| 2008/0122496 A1 * | 5/2008 | Wagner | G06J 1/00 327/107 |
| 2008/0136704 A1 * | 6/2008 | Chan | G01S 7/282 342/201 |
| 2008/0198933 A1 * | 8/2008 | Srinivasan | H04N 19/34 375/240.18 |
| 2008/0240448 A1 * | 10/2008 | Gustafsson | H04S 7/30 381/17 |
| 2009/0092326 A1 * | 4/2009 | Fukuhara | H04N 19/172 375/E7.076 |
| 2009/0219196 A1 * | 9/2009 | Bunch | G01S 7/22 342/176 |

(56) References Cited

U.S. PATENT DOCUMENTS

| | | | | |
|---|---|---|---|---|
| 2009/0267825 | A1* | 10/2009 | Vetro | G01S 13/9027 342/25 R |
| 2009/0310691 | A1* | 12/2009 | Park | H04L 27/266 375/260 |
| 2010/0001901 | A1* | 1/2010 | Baraniuk | G01S 7/32 342/25 F |
| 2010/0080114 | A1* | 4/2010 | Ratnam | H04L 5/0094 370/329 |
| 2010/0309958 | A1* | 12/2010 | Lakkis | H04J 13/0003 375/150 |
| 2010/0310009 | A1* | 12/2010 | Lakkis | H04L 27/2003 375/308 |
| 2010/0316172 | A1* | 12/2010 | Keehr | H04B 1/109 375/346 |
| 2011/0206144 | A1* | 8/2011 | Yamamoto | H04L 27/2332 375/345 |
| 2012/0063635 | A1* | 3/2012 | Matsushita | G06T 1/0028 382/100 |
| 2012/0183056 | A1* | 7/2012 | He | H04N 19/33 375/E7.243 |
| 2013/0114645 | A1* | 5/2013 | Huang | H04L 7/042 375/147 |
| 2014/0056341 | A1* | 2/2014 | Karabinis | H04W 12/04 375/300 |
| 2015/0117575 | A1* | 4/2015 | Ganesan | H04L 27/2613 375/347 |
| 2015/0171890 | A1* | 6/2015 | Pagnanelli | H03M 3/468 341/143 |
| 2015/0346321 | A1* | 12/2015 | Jansen | H03M 7/30 342/107 |
| 2016/0149377 | A1* | 5/2016 | Arsenijevic | H01S 5/06253 372/18 |
| 2016/0377705 | A1* | 12/2016 | Zack | A61B 5/7282 342/21 |
| 2016/0379462 | A1* | 12/2016 | Zack | G08B 25/016 340/539.12 |
| 2017/0077945 | A1* | 3/2017 | Pagnanelli | H03F 3/45475 |
| 2017/0110141 | A1* | 4/2017 | Craven | G10L 19/26 |
| 2017/0117944 | A1* | 4/2017 | Ram | H04B 7/0456 |
| 2017/0118050 | A1* | 4/2017 | Ram | H04L 1/0054 |
| 2017/0195831 | A1* | 7/2017 | Cronie | H04B 5/72 |
| 2018/0152204 | A1* | 5/2018 | Halbawi | H03M 13/3761 |
| 2018/0159548 | A1 | 6/2018 | Schmidt et al. | |
| 2018/0212724 | A1* | 7/2018 | Au Yeung | H04L 27/2337 |
| 2019/0238379 | A1* | 8/2019 | Walk | H04L 27/2627 |
| 2020/0150220 | A1* | 5/2020 | Maor | G01S 7/038 |
| 2020/0259534 | A1* | 8/2020 | Walk | H04L 7/048 |
| 2020/0403664 | A1* | 12/2020 | Walk | H04B 7/0452 |
| 2020/0403837 | A1* | 12/2020 | Walk | H04L 27/2639 |
| 2021/0273839 | A1* | 9/2021 | Takigawa | H04L 25/0212 |
| 2022/0052728 | A1* | 2/2022 | Walk | H04L 27/122 |
| 2022/0052898 | A1* | 2/2022 | Walk | H04L 25/0204 |
| 2023/0092437 | A1* | 3/2023 | Walk | H04L 7/048 375/267 |
| 2023/0128742 | A1* | 4/2023 | Walk | H04J 11/00 375/260 |
| 2023/0379203 | A1* | 11/2023 | Walk | H04J 11/00 |

FOREIGN PATENT DOCUMENTS

| | | |
|---|---|---|
| CN | 112042161 A | 12/2020 |
| CN | 114008985 A | 2/2022 |
| CN | 112042161 B | 9/2023 |
| CN | 117176539 A | 12/2023 |
| CN | 114008985 B | 3/2024 |
| EP | 1458156 A2 | 9/2004 |
| EP | 2675124 A2 | 12/2013 |
| EP | 3744057 A | 12/2020 |
| EP | 3921986 A1 | 12/2021 |
| JP | H08251036 A | 9/1996 |
| JP | 2008533867 A | 8/2008 |
| KR | 20060128053 A | 12/2006 |
| KR | 20070087190 A | 8/2007 |
| KR | 20080098485 A | 11/2008 |
| KR | 20080101911 A | 11/2008 |
| KR | 20100082385 A | 7/2010 |
| KR | 20210139244 A | 11/2021 |
| WO | 9800946 A2 | 1/1998 |
| WO | 2009152395 A2 | 12/2009 |
| WO | 2011048713 A1 | 4/2011 |
| WO | 2012027880 A1 | 3/2012 |
| WO | 2019148139 A1 | 8/2019 |
| WO | 2020163759 A1 | 8/2020 |

OTHER PUBLICATIONS

Extended European Search Report for European Application No. 20752692.2, Search completed Sep. 22, 2022, dated Oct. 5, 2022, 10 Pgs.

International Preliminary Report on Patentability for International Application PCT/US2020/017289, Report issued Aug. 10, 2021, dated Aug. 19, 2021, 7 Pgs.

International Preliminary Report on Patentability for International Application No. PCT/US2019/015480, Report issued Jul. 28, 2020, dated Aug. 6, 2020, 6 Pgs.

International Search Report and Written Opinion for International Application No. PCT/US2019/015480, Search completed Jun. 27, 2019, dated Jun. 27, 2019, 8 Pgs.

International Search Report and Written Opinion for International Application No. PCT/US2020/017289, Search dated Jun. 12, 2020, 10 Pgs.

Abed-Meraim et al., "Blind System Identification", Proceedings of the IEEE, vol. 85, No. 8, 1997, pp. 1310-1322.

Ahmed et al., "Blind deconvolution using convex programming", IEEE Transaction on Information Theory, vol. 60, No. 3, 2014, pp. 1711-1732.

Andrews et al., "What Will 5G Be?", IEEE Journal on Selected Areas in Communications, vol. 32, No. 6, Jun. 2014, pp. 1065-1082.

Baeza et al., "Performance of a Non-Coherent Massive SIMO M-DPSK System", IEEE 86th Vehicular Technology Conference (VTC-Fall), Toronto, Ontario, Sep. 24-27, 2017, 5 pgs.

Bomer et al., "Long energy efficient Huffman sequences", International Conference on Acoustics, Speech, and Signal Processing, 1991.

Candes et al., "Phase retrieval via wirtinger flow: theory and algorithms", IEEE Transactions on Information Theory, vol. 61, No. 4, 2015, pp. 1985-2007.

Cassioli et al., "The Ultra-Wide Bandwidth Indoor Channel: From Statistcal Model to Simulations", IEEE Journal on Selected Areas in Communications, vol. 20, No. 6, Aug. 2002, pp. 1247-1257, DOI: 10.1109/JSAC.2002.801228.

Chang et al., "Time synchronisation for OFDM-based WLAN systems", Electronics Letters, vol. 39, No. 13, 2003.

Choi, "Noncoherent OFDM-IM and Its Performance Analysis", IEEE Transactions on Wireless Communications, vol. 17, No. 1, Jan. 2018, pp. 352-360.

Da Rocha et al., "Uniform constant composition codes derived from repeated-root cyclic codes", Electronics Letters, vol. 54, No. 3, Feb. 8, 2018, pp. 146-148.

Ding et al., "Ill-convergence of Godard blind equalizers in data communication systems", IEEE Transactions on Communications, vol. 39, No. 9, 1991, pp. 1313-1327.

Dong et al., "Optimal Design and Placemat of Pilot Symbols for Channel Estimation", IEEE Transactions on Signal Processing, vol. 50, 2002, pp. 3055-3069.

Ghassemzadeh et al., "UWB indoor delay profile model for residential and commercial environments", IEEE 58th Vehicular Technology Conference. VTC, Oct. 2003.

Gilbert, "Cyclically Permutable Error-Correcting Codes", IEEE Transactions on Information Theory, vol. 9, No. 3, Jul. 1963, pp. 175-182.

Golomb et al., "Comma-Free Codes", Canadian Journal of Mathematics, vol. 10, 1958, pp. 202-209.

Gustafson et al., "On mm-wave multipath clustering and channel modeling", IEEE Transactions on Antennas and Propagation, vol. 62, No. 3, Mar. 2014, pp. 1445-1455.

(56) References Cited

OTHER PUBLICATIONS

Haghighatshoar et al., "Massive MIMO Pilot Decontamination and Channel Interpolation via Wideband Sparse Channel Estimation", arXiv, Retrieved from: https://arxiv.org/abs/1702.07207v1, 2017, 33 pgs.

He et al., "Covert Wireless Communication With a Poisson Field of Interferers", IEEE Transactions on Wireless Communications, vol. 17, No. 9, Sep. 2018.

Huffman, "The Generation of Impulse-Equivalent Pulse Trains", IEEE Transactions on Information Theory, vol. 8, 1962.

Jaeckel et al., "QuaDRiGa: A 3-D Mutli-Cell Channel Model with Time Evolution for Enabling Virtual Field Trials", IEEE Transactions on Antennas and Propagation, vol. 62, No. 6, Jun. 2014, pp. 3242-3256.

Jaganathan, "Convex programming-based phase retrieval: theory and applications", PhD Thesis, California Institute of Technology, 2016.

Jaganathan et al., "Reconstruction of signals from their autocorrelation and cross-correlation vectors, with applications to phase retrieval and blind channel estimation", arXiv.org, Retrieved from: https://arxiv.org/abs/1610.02620, Oct. 9, 2016.

Jiang et al., "Packet detection by a single OFDM symbol in URLLC for critical industrial control: A realistic study", IEEE Journal on Selected Areas in Communications, vol. 37, No. 4, 2019, pp. 933-946.

Jose et al., "Pilot contamination and precoding in multi-cell TDD systems", IEEE Transactions on Wireless Communications, vol. 10, No. 8, Aug. 2011, pp. 2640-2651.

Kuribayashi et al., "How to Generate Cyclically Permutable Codes From Cyclic Codes", IEEE Transactions on Information Theory, vol. 52, No. 10, Oct. 2006, pp. 4660-4663.

Lee et al., "Effect of carrier frequency offset on OFDM systems for multipath fading channels", IEEE Global Telecommunications Conference, Globecom, 2004.

Lemos-Neto et al., "Cyclically permutable codes specified by roots of generator polynomial", Electronics Letters, vol. 50, No. 17, Aug. 14, 2014, pp. 1202-1204.

Levenshtein, "Combinatorial Problems Motivated By Comma-Free Codes", Journal of Combinatorial Designs, vol. 12, No. 3, Jan. 26, 2004, pp. 184-196.

Li et al., "Rapid, Robust, and Reliable Blind Deconvolution via Nonconvex Optimization", arXiv.org, Retrieved from: https://arxiv.org/abs/1606.04933, Jun. 15, 2016.

Liang et al., "A novel time of arrival estimation algorithm using an energy detector receiver in MMW system", EURASIP Journal on Advances in Signal Processing, vol. 2017, No. 1, Dec. 2017.

Liu et al., "A High-Efficiency Carrier Estimator for OFDM Communications", IEEE Communications Letters, vol. 2, No. 4, Apr. 1998, pp. 104-106.

Liu et al., "Analysis of energy detection receiver for TOA estimation in IR UWB ranging and a novel TOA estimation approach", Journal of Electromagnetic Waves and Applications, vol. 28, No. 1, pp. 49-63, Nov. 2013.

Luvisotto et al., "Physical layer design of high-performance wireless transmission for critical control applications", IEEE Transactions on Industrial Informatics, vol. 13, No. 6, 2017, pp. 2844-2854.

Luvisotto et al., "Ultra high performance wireless control for critical applications: Challenges and directions", IEEE Transactions on Industrial Informatics, vol. 13, No. 3, 2017, pp. 1448-1459.

Moose, "A Technique for Orthogonal Frequency Division Multiplexing Frequency Offset Correction", IEEE Transactions on Communications, vol. 42, No. 10, Oct. 1994, pp. 2908-2914.

Moose et al., "A technique for orthogonal frequency division multiplexing frequency offset correction", IEEE Transactions on Communications, vol. 42, No. 10, Oct. 1994, pp. 2908-2914.

Park et al., "Performance analysis of channel estimation for OFDM systems with residual timing offset", IEEE Transactions on Wireless Communications, vol. 5, No. 7, 2006, pp. 1622-1625.

Park et al., "Short-range wireless communications for next-generation networks: UWB, 60 GHz millimeter-wave WPAN, and ZigBee", IEEE Wireless Communications, vol. 14, No. 4, 2007, pp. 70-78.

Rappaport et al., "Millimeter wave mobile communications for 5G cellular: It will work!", IEEE Access, vol. 1, May 2013, pp. 335-349.

Redinbo et al., "Systematic Construction of Cyclically Permutable Code Words", IEEE Transactions on Communications, vol. 23, No. 7, Jul. 1975, pp. 786-789.

Sahinoglu et al., "Threshold-based TOA estimation for impulse radio UWB systems", IEEE International Conference on Ultra-Wideband, Sep. 2005.

Salous et al., "Millimeter-wave propagation: Characterization and modeling toward fifth-generation systems", IEEE Antennas and Propagation Magazine, vol. 58, No. 6, Dec. 2016.

Sayeed et al., "Secure Wireless Communications: Secret Keys Through Multipath", IEEE International Conference on Acoustics, Speech and Signal Processing, Las Vegas, Nevada, Mar. 31-Apr. 4, 2008, pp. 3013-3016.

Schmidl et al., "Low-overhead, low-complexity [burst] synchronization for OFDM", Proceedings of ICC/Supercomm 1996, International Conference on Communications, Jun. 23-27, 1996.

Schmidl et al., "Robust Frequency and Timing Synchronization for OFDM", IEEE Transactions on Communications, vol. 45, No. 12, Dec. 1997, pp. 1613-1621.

Smida, "Coding to Reduce the Interference to Carrier Ratio of OFDM Signals", Eurasip Journal On Wireless Communications And Networking, Jan. 28, 2017, vol. 21, No. 1, pp. 1-11, XP021268625, DOI: 10.1186/S13638-017-0809-3.

Tong et al., "A new approach to blind identification and equalization of multipath channels", 25th Asilomar Conference, 1991, pp. 856-860.

Tong et al., "Blind channel identification based on second-order statistics: a frequency-domain approach", IEEE Transactions on Information Theory, vol. 41, No. 1, 1995, pp. 329-334.

Tureli et al., "OFDM Blind Carrier Offset Estimation: ESPRIT", IEEE Transactions on Communications, vol. 48, No. 9, Sep. 2000, pp. 1459-1461.

Walk, "Ambiguities on convolutions with applications to phase retrieval", 2016 50th Asilomar Conference on Signals, Systems and Computers, Nov. 6-9, 2016.

Walk et al., "Blind Deconvolution with Additional Autocorrelations via Convex Programs", arXiv.org, 1701.04890, 2017.

Walk et al., "Constrained Blind Deconvolution using Wirtinger Flow Methods", 12th International Conference, Sampling Tehory and Applications, Jul. 2017, Tallinn, Estonia.

Walk et al., "Constrained Blind Deconvolution using Wirtinger Flow Methods", 2017 International Conference on Sampling Theory and Applications (SampTA), Jul. 3-7, 2017.

Walk et al., "MOCZ for Blind Short-Packet Communication: Basic Principles", IEEE Transactions on Wireless Communications, vol. 18, No. 11, pp. 5080-5097.

Walk et al., "MOCZ for Blind Short-Packet Communication: Some Practical Aspects", arXiv.org, Retrieved from: https://arxiv.org/abs/1902.02928, Feb. 8, 2019, 34 pgs.

Walk et al., "Noncoherent Short-Packet Communication via Modulation on Conjugated Zeros", Arxiv.Org, Cornell University Library, 201 Olin Library Cornell University Ithaca, May 21, 2018, XP080880371, arXiv:180507876v1.

Walk et al., "On the Stability of Sparse Convolutions", ArXiv, Retrieved from: https://arxiv.org/abs/1409.6874v1, 22 pgs.

Walk et al., "Physical Layer Secure Communications over Wireless Channels via Common Zeros", 2018, IEEE International Symposium on Information Theory (ISIT), Vail, CO, 2018, pp. 191-195, doi: 10.1109/ISIT.2018.8437476.

Walk et al., "Short-Message Communication and FIR System Identification using Huffman Sequences", Arxiv.org, Cornell University Library, Feb. 1, 2017, XP080746219, Retrieved from: https://arxiv.org/abs/1702.00160.

Walk et al., "Short-Message Communication and FIR System Identification using Huffman Sequences", IEEE International Symposium on Information Theory, Jun. 2017, Aachen, Germany.

(56) References Cited

OTHER PUBLICATIONS

Wang et al., "Weighted Energy Detection for Noncoherent Ultra-Wideband Receiver Design", IEEE Transactions on Wireless Communications, vol. 10, No. 2, Feb. 2011.

Wunder et al., "5GNOW: Non-Orthogonal, Asynchronous Waveformsfor Future Mobile Applications", IEEE Communications Magazine, vol. 52, No. 2, Feb. 2014, pp. 97-105.

Wunder et al., "Sparse Signal Processing Concepts for Efficient 5G System Design", arXiv.org, Retrieved from: https://arxiv.org/abs/1411.0435, Nov. 3, 2014.

Xu et al., "A least-squares approach to blind channel identification", IEEE Transaction on Signal Processing, vol. 43, No. 12, 1995, pp. 2982-2993.

Yan et al., "Low Probability of Detection Communication: Opportunities and Challenges", arXiv, Retrieved from: https://arxiv.org/abs/1906.07895v1, Jun. 19, 2019, 7 pgs.

Zhang et al., "Extensions and sharpenings of Jordan's and Kober's inequalities", Journal of Inequalities in Pure and Applied Mathematics, vol. 7, No. 2, Art. 63, 2006.

Zhang et al., "Novel Blind Carrier Frequency Offset Estimation for OFDM System with Multiple Antennas", IEEE Transactions on Wireless Communications, vol. 9, No. 3, Mar. 11, 2010, pp. 881-885.

Zhang et al., "Pilot contamination elimination for large-scale multiple-antenna aided OFDM systems", IEEE Journal of Selected Topics in Signal Processing, vol. 8, No. 5, Oct. 2014, pp. 759-772.

Shaodong, "Symbol Timing and Carrier Frequency Synchronization Methods for OFDM in Non-cooperative Communication", Chinese Master's Theses, Nov. 2014, Full-text Database, No. 3.

Hong et al., "Cyclic Prefix Based Carrier Frequency Offset Estimation Method in LTE System", A Electronic Testing, A in the LTE system based on the pre-cycle carrier frequency offset estimation method, Apr. 6, 2010, Issue 04, Full text 1-24 Type URL Network Release Day.

* cited by examiner

Algorithm 1 Wirtinger's gradient descent with backtracking

Input: Initial solution $z^{(0)}$, initial step-size $\eta_0 > 0$, step-size scaling factor $\beta \in (0,1)$, Armijo-Goldstein factor $c \in (0.2)$, termination criterion $e > 0$.
Output: Approximate solution $z^{(i)}$.
procedure GRADIENT
    for $i := 1, \ldots$ do
        $\eta \leftarrow \text{Backtrack}\left(\eta_0, \beta, c, z^{(i-1)}\right)$
        $z^{(i)} \leftarrow z^{(i-1)} - \eta \nabla F\left(z^{(i-1)}\right)$
        if $\|\nabla F\left(z^{(i)}\right)\| < e$ then
            return $z^{(i)}$
        end if
    end for
end procedure

*FIG. 5*

Algorithm 2 Backtracking line search

Input: Initial step-size $\eta^{(0)} > 0$, step-size deceleration factor $\beta \in (0, 1)$ condition parameter $c \in (0, 2)$, start point $z$.
Output: Approximately ideal step-size $\eta^{(i)}$.
procedure BACKTRACK
  for $i = 0, \ldots,$ do
    if $F(z - \eta^{(i)} dF(z)) > F(z) - c\eta^{(i)} \|dF(z)\|_2^2$ then
      $\eta^{(i+1)} \leftarrow \beta \eta^{(i)}$
    else
      return $\eta^{(i)}$
    end if
  end for
end procedure

FIG. 6

SYSTEMS AND METHODS FOR COMMUNICATING BY MODULATING DATA ON ZEROS

CROSS-REFERENCE TO RELATED APPLICATIONS

The present invention is a continuation of U.S. patent application Ser. No. 17/805,207 entitled "Systems and Methods for Communicating by Modulating Data on Zeros" to Philipp Walk et al., filed Jun. 2, 2022 and issued on Jul. 25, 2023 as U.S. Pat. No. 11,711,253, which is a continuation of U.S. patent application Ser. No. 17/202,221 entitled "Systems and Methods for Communicating by Modulating Data on Zeros" to Philipp Walk et al., filed Mar. 15, 2021 and issued on Jun. 14, 2022 as U.S. Pat. No. 11,362,874, which is a continuation of U.S. patent application Ser. No. 17/009,696 entitled "Systems and Methods for Communicating by Modulating Data on Zeros" to Phillip Walk et al., filed Sep. 1, 2020 and issued on Apr. 27, 2021 as U.S. Pat. No. 10,992,507, which is a continuation of U.S. patent application Ser. No. 16/260,059 entitled "Systems and Methods for Communicating by Modulating Data on Zeros," filed Jan. 28, 2019 and issued on Oct. 6, 2020 as U.S. Pat. No. 10,797,926, which claims priority to U.S. Provisional Patent Application No. 62/622,673 entitled "Modulation on Conjugated Zeros" to Philipp Walk et al., filed Jan. 26, 2018, the disclosures of which are herein incorporated by reference in their entireties.

STATEMENT OF FEDERALLY SPONSORED RESEARCH

This invention was made with government support under Grant No. CCF1018927 & CCF1423663 & CCF1409204 & CNS0932428 awarded by the National Science Foundation. The government has certain rights in the invention.

FIELD OF THE INVENTION

The present invention generally relates to digital communications and more specifically to blind communication schemes that transmit over unknown wireless multipath channels.

BACKGROUND

The future generation of wireless networks faces a diversity of new challenges. Trends on the horizon—such as the emergence of the Internet of Things (IoT) and the tactile Internet—have radically changed thinking about how to scale the wireless infrastructure. Among the main challenges new emerging technologies have to cope with is the support of a massive number (billions) of devices ranging from powerful smartphones and tablet computers to small and low-cost sensor nodes. These devices come with diverse and even contradicting types of traffic including high speed cellular links, massive amount of machine-to-machine (M2M) connections, and wireless links which carrying data in short-packets. Short messages of sporadic nature likely will dominate in the future and the conventional cellular and centrally-managed wireless network infrastructure will not be flexible enough to keep pace with these demands. Although intensively discussed in the research community, the most fundamental question of how we will communicate in the near future under such diverse requirements remains largely unresolved.

A key problem of supporting sporadic and short-message traffic types is how to acquire, communicate, and process channel information. Conventional channel estimation procedures typically require a substantial amount of resources and overhead. This overhead can dominate the intended information exchange when the message is short and the traffic sporadic. For example, once a node wakes up in a sporadic manner to deliver a message it has first to indicate its presence to the network. Secondly, training symbols (pilots) are typically used to provide sufficient information at the receiver for estimating link parameters such as the channel coefficients. Finally, after exchanging a certain amount of control information, the device transmits its desired information message on pre-assigned resources. In current systems these steps are usually performed sequentially in separate communication phases yielding a tremendous overhead once the information message is sufficiently short and the nodes wake up in an unpredictable way. Therefore, a redesign and rethinking of several well-established system concepts and dimensioning of communication layers will likely be necessary to support such traffic types in an efficient manner. Noncoherent and blind strategies, provide a potential way out of this dilemma. Classical approaches like blind equalization have been investigated in the engineering literature, but new noncoherent modulation ideas which explicitly account for the short-message and sporadic type of data will likely be required.

To transmit digital data over a physical system, called a channel, the data is modulated on an analog signal, typically by a digital-to-analog device. This device will modulate the digital data onto complex-valued amplitudes of equidistant shifts, called sampling period, of an analog baseband pulse. The superposition will form the analog baseband signal, which will be transmitted by an antenna in a certain frequency range to the receiver. Standard binary data modulation schemes used in digital communication are On-Off Keying (OOK), Binary Phase Shift Keying (BPSK), Binary Frequency Shift Keying (BFSK), to encode 1 bit per degree of freedom, whereas general M-ary modulation schemes are used to encode M>1 bits per degree of freedom.

In many wireless communication scenarios the transmitted signals are affected by multipath propagation and the channel will therefore be frequency-selective if the channel delay spread exceeds the sampling period. Additionally, in mobile and time-varying scenarios one encounters also time-selective fast fading. In both cases channel parameters typically have a random flavour and potentially cause various kinds of interference. From a signal processing perspective it is, therefore, desirable to take care of possible signal distortions, at the receiver and potentially also at the transmitter.

A known approach to deal with multipath channels is to modulate data on multiple parallel waveforms, which are well-suited for the particular channel conditions. A simple approach that can be utilized for frequency-selective multipath channels is orthogonal frequency division multiplexing (OFDM). When the maximal channel delay spread is known, inter-symbol-interference (ISI) can be avoided by a suitable guard interval. Orthogonality of the subcarriers can be achieved by a cyclic prefix preventing inter-carrier-interference. On the other hand, from an information-theoretic perspective, random channel parameters are helpful from a diversity view point. Spreading data over subcarriers can exploit diversity in a frequency-selective fading channel. But to coherently demodulate the data symbols at the receiver, the channel impulse response (CIR) should be known at least at the receiver. To gain knowledge of the CIR, training data (pilots) are typically added to the information baseband samples, leading to a substantial overhead when the number of samples per signal is in the order of the channel taps. If the number of samples is even less than the number of channel taps, it can be mathematically impossible to accurately estimate from any pilot data the channel (assuming full support). Hence, one is either forced to increase the signal length by adding more pilots or assume some side-information on the channel. Furthermore, the pilot density has to be adapted to the mobility and, in particular. OFDM is very sensitive to time-varying distortions due to Doppler shift and oscillator instabilities. Dense CIR updates are often required, which can result in complex transceiver designs.

There are only a few works on noncoherent OFDM schemes in the literature. The classical approach is given by orthogonal signaling, as for example with pulse position modulation (PPM) or special code division multiplexing approaches. In the frequency domain, non-coherent approaches are known as self-heterodyne OFDM or self-coherent OFDM. Very recently a noncoherent method for OFDM with Index Modulation (IM) was proposed, which exploits a sparsity of Q active subcarriers out of N. The modulation can be seen as a generalized N-ary frequency shift keying (FSK), which uses Q tones (frequencies) and results in a codebook of $$M = \binom{N}{Q}$$

non-orthogonal constellations. By grouping the N available subcarriers in N/G groups of size G>Q the spectral-efficiency/performance can be improved.

SUMMARY OF THE INVENTION

Systems and methods in accordance with various embodiments of the invention utilize a modulation scheme referred to as Modulation of Zeros (MOZ), which is a modulation scheme that modulates a sequence of bits on K distinct zeros of the z-transform of a fixed set of normalized complex-valued sequences of length K+1, which is known at the transmitter and receiver. In a number of embodiments. MOZ can involve Modulation of Conjugate-reciprocal Zeros (MOCZ, pronounced as "moxie"). In several embodiments, MOZ can involve Binary Modulation of Conjugate-reciprocal Zeros (BMOCZ). Most conventional modulation schemes modulate data either in time or frequency domain, which are connected by the linear Fourier transform. The MOZ modulation schemes described herein operates on the complex-valued zeros of the z-transform of the discrete-time baseband signals. Each of these modulation schemes can be utilized within communication systems in accordance with various embodiments of the invention to reliably transmit information data over unknown FIR channels by encoding the message onto the zero structure of the z-transform of the transmitted sequence.

In many embodiments, use of a MOZ modulation scheme enables a number of bits to be transmitted that is proportional to the transmitted signal length and does not require the transmission of any pilot data. In a single block transmission scenario, neither the transmitter nor the receiver need to know anything about the FIR channel: neither its coefficients, nor even its length. In many embodiments, the receiver simply takes as many signal samples as are above the noise level to collect all significant paths.

When the number of transmitted bits is small, an exhaustive search over all joint zero configurations is possible, thereby allowing implementation of a Maximum-Likelihood (ML) receiver. If not, a decoder can attempt to locate the transmitted zeros by determining the roots of the received polynomial and performing some sort of nearest neighbor search. Better yet, decoders in accordance several embodiments of the invention search for the zeros independently by directly testing for the zero locations, one at a time, a scheme that can be referred to as DiZeT.

When the zeros are chosen in conjugate-reciprocal pairs (MOCZ), a scheme can be obtained with many desirable properties: the transmitted sequences have all the same autocorrelation function, and the linear time simple DiZeT decoder discussed below has near ML performance. In several embodiments, the particular conjugate-reciprocal zeros result in Huffman sequences with further favorable properties.

Extensive simulations of the MOZ. MOCZ, and BMOCZ methods, and their various decoders, demonstrate favorable performance in the regimes of interest (short packet lengths and sporadic communication) compared to existing pilotless schemes (PPM and blind OFDM), as well as pilot schemes. Exemplary simulations demonstrating the merits of MOZ schemes in the presence of noise, timing uncertainty and carrier frequency uncertainty are discussed below.

In a number of embodiments, communications that include MOZ schemes incorporate multiple transmitters and/or multiple receivers. When the receiver has M antennas, receive antenna diversity can be exploited, since each antenna receives each MOCZ symbol over an independent channel realization.

A communication system in accordance with one embodiment of the invention includes a transmitter having: a modulator configured to modulate a plurality of information bits to obtain a discrete-time baseband signal, where the plurality of information bits are encoded in the zeros of the z-transform of the discrete-time baseband signal; and a signal generator configured to generate a continuous-time transmitted signal based upon the discrete-time baseband signal. In addition, the communication system includes a receiver having: a demodulator configured to sample a received continuous-time signal at a given sampling rate; a decoder configured to decode a plurality of bits of information from the samples of the received signal by determining a plurality of zeros of a z-transform of a received discrete-time baseband signal based upon samples from the received continuous-time signal, identifying zeros from the plurality of zeros that encode the plurality of information bits, and outputting a plurality of decoded information bits based upon the identified zeros.

In a further embodiment, the plurality of zeros of the z-transform of the received discrete-time baseband signal includes a plurality of zeros that encode information bits and at least one zero introduced by multipath propagation of the transmitted signal.

In another embodiment, the z-transform of the discrete-time baseband signal comprises a zero for each of a plurality of encoded bits.

In a still further embodiment, each zero in the z-transform of the discrete-time baseband signal is limited to being one of a set of conjugate-reciprocal pairs of zeros.

In still another embodiment, each conjugate reciprocal pair of zeros in the set of conjugate-reciprocal pairs of zeros includes: an outer zero having a first radius that is greater than one; an inner zero having a radius that is the reciprocal of the first radius, where the inner and outer zero have phases that are the same phase; the radii of the outer zeros in each pair of zeros in the set of conjugate-reciprocal pairs of zeros are the same; and the phases of the outer zeros in each pair of zeros in the set of conjugate-reciprocal pairs of zeros are evenly spaced over one complete revolution.

In a yet further embodiment, the discrete-time baseband signal is a Huffman sequence.

In yet another embodiment, at least one of the zeros of the z-transform of the discrete-time baseband signal encodes a plurality of encoded bits.

In a further embodiment again, the at least one zero in the z-transform of the discrete-time baseband signal that encodes a plurality of encoded bits is limited to being a zero from a set of more than two zeros.

In another embodiment again, the at least one zero in the z-transform of the discrete-time baseband signal that encodes a plurality of encoded bits is limited to being a zero from a set of multiple conjugate-reciprocal pairs of zeros.

In a further additional embodiment, any bit encoding/labeling of each transmitted zero to the set of admissible zero positions can be used, for example, by Gray coding.

In another additional embodiment, each conjugate-reciprocal pair of zeros in the set of multiple conjugate-reciprocal pairs of zeros have phases that are distinct from the other conjugate-reciprocal pair of zeros in the set of multiple conjugate-reciprocal pairs of zeros.

In as still yet further embodiment, each zero in the set of multiple conjugate-reciprocal pairs of zeros have the same phase.

In still yet another embodiment, the decoder is configured to determine the most likely set of zeros for the z-transform of the discrete-time baseband signal used to generate the transmitted signal based upon the samples of the received continuous-time signal.

In a still further embodiment again, the decoder determines the most likely set of zeros for the z-transform of the discrete-time baseband signal used to generate the transmitted signal using an autocorrelation codebook.

In still another embodiment again, the decoder determines the decoded information bits by performing a weighted comparison of samples of the z-transform of the received discrete-time baseband signal with each zero in a set of zeros.

In a further additional embodiment, each zero in the z-transform of the discrete-time baseband signal used to generate the transmitted signal is limited to being one of a set of conjugate-reciprocal pairs of zeros.

In another additional embodiment, each zero in the z-transform of the discrete-time baseband signal used to generate the transmitted signal is limited to being one of a conjugate-reciprocal pairs of zeros.

In a still yet further embodiment again, the decoder performs the weighted comparison using an inverse discrete Fourier transform of delayed and weighted samples of the received continuous-time signal.

In still yet another embodiment again, the decoder is configured to determine zeros that encode the plurality of information bits by identifying zeros from a set of possible zeros that are closest to the zeros of the received signal determined based upon a given distance measure.

In a still yet further additional embodiment, the decoder is configured to separate zeros of the received signal that encode information bits and zeros of the received signal introduced by multipath propagation of the transmitted signal by selecting a predetermined number of the zeros of the received signal based upon the distance between each zero in the received signal and a corresponding closest zero in the set of possible zeros.

In still yet another additional embodiment, the modulator is configured to encode the plurality of information bits using an outer code and the decoder is configured to correct bit errors in decoded information bits using the outer code.

In a still yet further additional embodiment again, the receiver is configured to estimate characteristics of a channel over which the received continuous-time signal was transmitted.

In still yet another additional embodiment again, the transmitter and receiver are configured to transition to communicating using a non-blind communication scheme, wherein the non-blind communication scheme is configured based upon the estimated channel characteristics.

In another further embodiment, the receiver comprises a plurality of receive antennas and the decoder determines the decoded information bits based upon a plurality of continuous-time signals received by the plurality of receive antennas.

In still another further embodiment, the continuous-time time transmitted signal comprises a carrier frequency modulated based upon the discrete-time baseband signal.

In yet another further embodiment, the demodulator comprises an analog to digital converter.

A transmitter in accordance with one embodiment includes a modulator configured to modulate a plurality of information bits to obtain a discrete-time baseband signal, where the plurality of information bits are encoded in the zeros of the z-transform of the discrete-time baseband signal, and a signal generator configured to generate a continuous-time transmitted signal based upon the discrete-time baseband signal.

In a further embodiment, the continuous-time transmitted signal comprises a carrier frequency modulated based upon the discrete-time baseband signal.

A receiver in accordance with one embodiment includes a demodulator comprising an analog to digital converter configured to sample a continuous-time received signal, and a decoder configured to decode a plurality of bits of information based upon the samples of the continuous-time received signal by: determining a plurality of zeros of a z-transform of a received discrete-time baseband signal based upon samples from the received continuous-time signal; identifying zeros from the plurality of zeros that encode the plurality of information bits; and outputting a plurality of decoded information bits based upon the identified zeros.

BRIEF DESCRIPTION OF THE DRAWINGS

It should be noted that the patent or application file contains at least one drawing executed in color. Copies of this patent or patent application publication with color drawing(s) will be provided by the Office upon request and payment of the necessary fee.

FIG. 5 conceptually illustrates a gradient decent algorithm in accordance with an embodiment of the invention.

FIG. 6 conceptually illustrates a backtracking line search algorithm in accordance with an embodiment of the invention.

DETAILED DESCRIPTION

Figure 1:
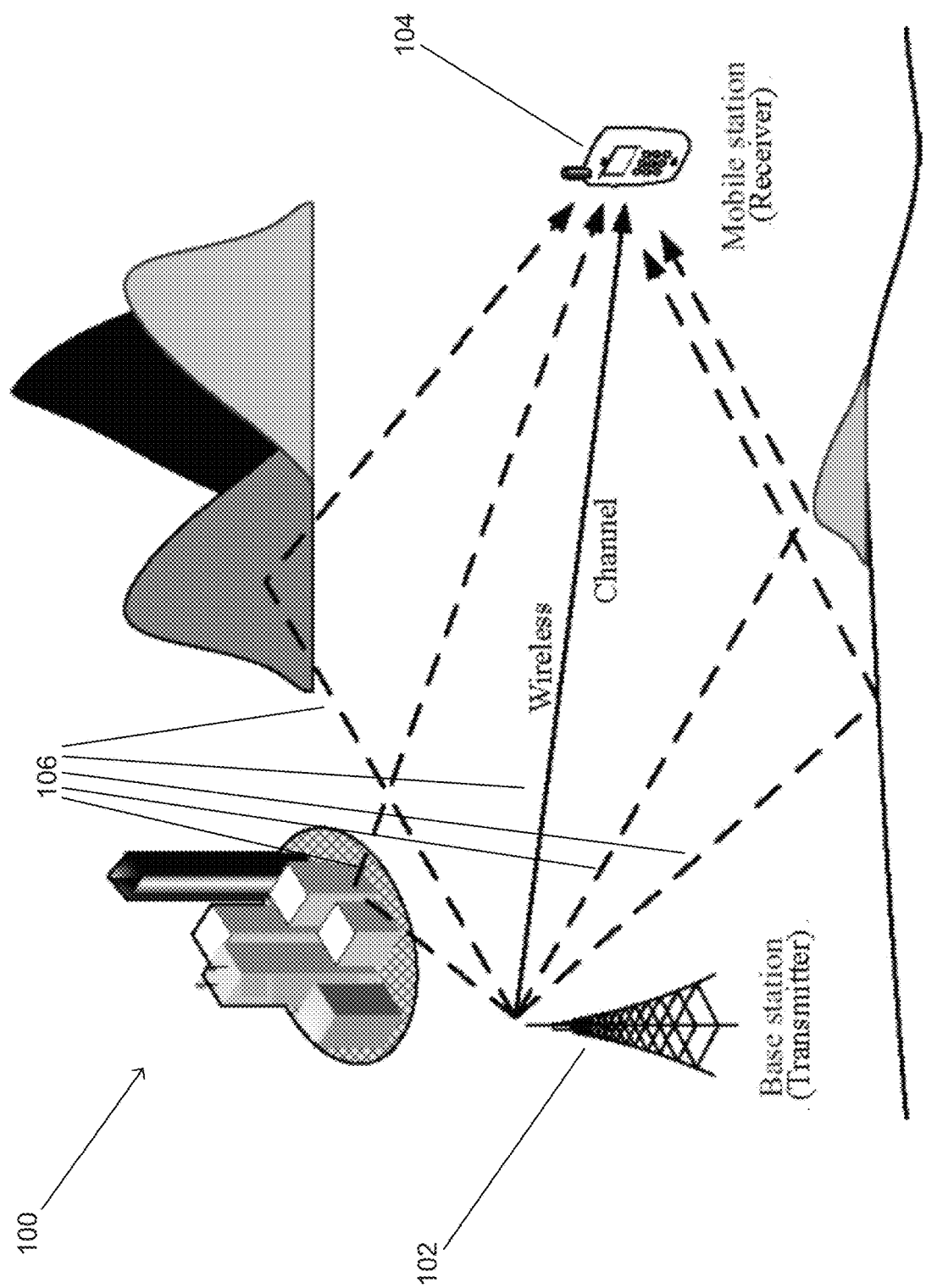
FIG. 1 conceptually illustrates multipath propagation of transmitted signals.

Turning now to the drawings, systems and methods for communicating data by transmitting waveforms, where the data is represented by the zeros of the z-transform of the transmitted waveform in accordance with various embodiments of the invention are illustrated. The process of modulating data on the zeros of the z-transform of the transmitted signal can be referred to as a Modulation on Zeros (MOZ) modulation scheme. A number of MOZ schemes can be implemented in accordance with various embodiments of the invention.

In many embodiments, the transmitter modulates data onto conjugate-reciprocal zeros of the z-transform of the transmitted signal. Modulation on Conjugate-reciprocal Zeros can be referred to as a MOCZ modulation (pronounced "Moxie"). In several embodiments, MOCZ involves selecting between transmission of conjugate-reciprocal pairs of zeros (in the complex plane) and thereby transmitting a signal that is constructed using a polynomial whose degree is the number of payload bits. In a number of embodiments, a non-linear modulation on polynomial zeros utilizes Huffman sequences. As is discussed below, use of Huffman sequences can enable implementation of efficient and reliable decoders. In a number of embodiments, a ML decoder is implemented that depends only on the power delay profile of the channel and the noise power. In certain embodiments, a low complexity decoder specifically designed for Huffman sequences is utilized having a complexity which scales only linearly in the number of bits to transmit. In many embodiments, receiver utilizes receiver diversity to improve system performance. In addition to describing a variety of communication systems that utilize MOZ modulation schemes and employing practical decoders, the following discussion presents simulation results that demonstrate that communication systems based upon MOZ schemes are able to outperform noncoherent OFDM-IM and pilot based M-QAM schemes in terms of bit-error rate in a variety of circumstances.

Communication systems and methods that utilize MOZ in accordance with various embodiments of the invention are discussed in detail in the sections that follow. The discussion is structured to introduce some conventions regarding the notation used to describe the various communication systems described herein, a generalized overview of communication systems that utilize MOZ are presented, MOCZ and BMOCZ systems are described (including systems based upon the use of Huffman sequences), a number of practical decoder implementations are presented, and then simulation results are presented that compare the performance of communication systems that employ MOZ schemes and conventional blind communication systems. While much of the discussion that follows focuses on the use of specific MOCZ and Huffman sequence based Binary MOCZ (BMOCZ) schemes, the techniques described herein can be used to extend the MOZ modulation and encoding principles to general codebooks based on polynomial zeros.

Notation

In the discussion that follows, small letters are used for complex numbers in $\mathbb{C}$. Capital Latin letters denote natural numbers $\mathbb{N}$ and refer to fixed dimensions, where small letters are used as indices. The first N natural numbers are denoted by $[N]=\{0, 1, \ldots, N-1\}$. Boldface small letters denote vectors and capitalized letters refer to matrices. Upright capital letters denote complex-valued polynomials in $\mathbb{C}$. For a complex number x=a+jb, given by its real part Re(x)=a∈$\mathbb{R}$ and imaginary part Im(x)=b∈$\mathbb{R}$ with imaginary unit j=$\sqrt{-1}$, its complex-conjugation is given by $\bar{x}$=a−jb and its absolute value by $|x|=\sqrt{x\bar{x}}$. For a vector x∈$\mathbb{C}^N$ we denote by $\overline{x^-}$ its complex-conjugated time-reversal or conjugated-reciprocal, given as $x_n^-=\bar{x}_{N-n}$ for n∈[N]. We use A*=$\bar{A}^T$ for the complex-conjugated transpose of the matrix A. For the identity and all zero matrix in N dimension we write $I_N$ respectively $O_N$. By $D_x$ we refer to the diagonal matrix generated by the vector x∈$\mathbb{C}^N$. The N×N unitary Fourier matrix F=$F_N$ is given entry-wise by $f_{l,k}=e^{j2\pi k/N}/\sqrt{N}$ for l,k∈[N]. The all one respectively all zero vector in dimension N will be denoted by $1_N$ resp. $0_N$. The $\ell_p$-norm of a vector x∈$\mathbb{C}^N$ is given by $\|x\|_p=(\Sigma_{k=1}^N|x_k|^p)^{1/p}$ for p≥1. If p=∞ then $\|x\|_\infty=\max_k|x_k|$. The expectation of a random variable x is denoted by 𝔼 [x]. The disclosure also refers to x·y:=diag(x)y as the Hadamard (point-wise) product of the vectors x,y∈ ℂ $^N$.

System Model

Systems and methods in accordance with many embodiments of the invention involve transmission of data of an unknown multipath channel. Multipath propagation of transmitted data is conceptually illustrated in FIG. 1. In the illustrated embodiment, the communication system 100 includes a base station 102 that is acting as a broadcasting transmitter and an arbitrary mobile station 104 that is acting as a receiver. In the illustrated embodiment, the signal transmitted by the base station 102 can be received by the mobile station in 104 via six different 106 paths of propagation. Therefore, the signal received by mobile station 104 is a superposition of the signals received via the different paths subject to the various delays experienced by the signals. The channel also introduces noise.

Figure 2:
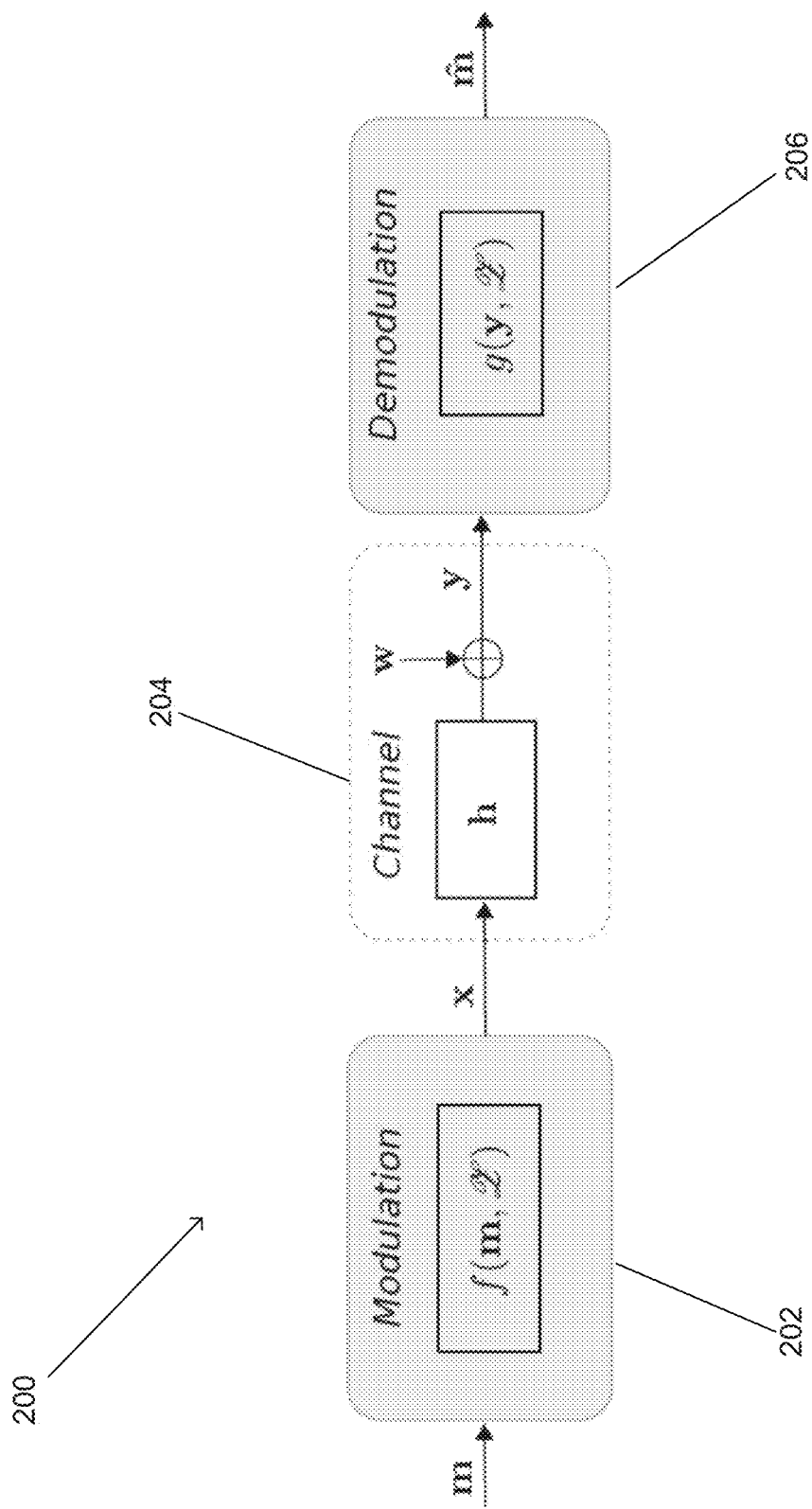
FIG. 2 conceptually illustrates a transmitter and receiver that utilize a binary MOZ scheme over an unknown multipath channel implemented in accordance with an embodiment of the invention.

In order to obtain a general appreciation of the manner in which a system that relies upon MOZ modulation transmits data blindly over a multipath communication channel, a transmitter and receiver that utilize a binary MOZ scheme over an unknown multipath channel implemented in accordance with an embodiment of the invention are conceptually illustrated in FIG. 2. The communication system 200 includes a modulator 204 within the transmitter that performs a modulation operation f to transmit data over a multipath channel 205 and a decoder 206 within a receiver that performs a demodulation/decoder operation g. As discussed below, both the modulation operation f and the decoder operation g rely on at least on shared zero-codebook 𝒵. It is in principal possible that a receiver can blindly identify the used zero-codebook taken from a predefined set of zero-codebooks to allow for example multiple access schemes. As is discussed below, the transmitter and receiver described herein are practical and can be implemented using logic devices including (but not limited to) field programmable gate arrays, digital signal processors, and/or any of a variety of conventional software defined radio platforms.

The binary message sequence $m_k \in \{0,1\}$ is chunked at the transmitter in blocks of length K. For BMOCZ, the modulator f encodes the block m to a normalized complex-valued symbol (sequence) $x=(x_0, \ldots, x_K)^T \in \mathbb{C}^{K+1}$ by using the zero-codebook 𝒵 of cardinality $2^K$. In many embodiments, when the block size K is small, the discrete-time BMOCZ symbols can be pre-generated using the methods described below for creating a codebook, and is selected using a lookup mechanism such as (but not limited to) a lookup table. The BMOCZ symbol x is typically modulated onto a carrier frequency $f_c$ with a pulse generator running at a sampling clock T=1/W to transmit a real-valued passband signal of bandwidth W to the receiver over an unknown time-invariant channel with a maximum delay spread of $T_d$=LT which resolves L equally spaced multi-paths (delays). After a down-converting and sampling to the discrete-time baseband, the receiver observes the channel output y under an unknown additive noise vector w. The demodulator/decoder 206 can obtain from the received signal an estimated block codeword m by the knowledge of the zero-codebook 𝒵.

Although a specific binary MOZ scheme is described above with reference to FIG. 2, as is discussed below, a variety of MOZ schemes can be implemented as appropriate to the requirements of a given application in accordance with various embodiments of the invention including (but not limited to) communication systems that employ M-ary MOZ schemes. MOCZ schemes, multiple receive antennas and/or outer codes to provide additional error correction capabilities enabling recovery of message bits in the face of received bit errors. In order to appreciate these different variants a more complex and generalized model of a communication system that utilizes a MOZ scheme is described below.

System Models for Point-to-Point Communication Systems Employing MOZ Schemes

Many embodiments of the invention can be modeled as a single-antenna point-to-point communication over a frequency-selective block-fading channel, where the channel delay spread $T_d$=LT is in the order of the signal (block) duration $T_s$=NT, given by the symbol period or sampling rate T and overall block length N. Over short transmissions, the channel can be assumed to be time-invariant or quasi-static in each block, but may change arbitrarily from block to block. Conventional coherent communication strategies, mostly based on OFDM, are expected to be inefficient in this regime. Accordingly, systems and methods in accordance with various embodiments of the invention utilize a noncoherent modulation scheme, which keeps the information invariant under multipath propagation and thereby can avoid channel estimation and equalization at the receiver. Given these assumptions, the discrete-time baseband model for the system can be expressed as:

$$y_n = (h*x)_n + w_n = \sum_{l=0}^{L-1} h_l x_{n-l} + w_n \text{ for} \quad (1)$$

$$n \in [N] := \{0, 1, \ldots, N-1\},$$

where $x=(x_0, \ldots, x_K)\in \mathbb{C}^{K+1}$ denotes the transmitted discrete-time baseband signal (symbol) with coefficients $x_k$ and $h=(h_0, \ldots, h_{L-1})\in \mathbb{C}^L$ the channel coefficients (taps). The vector $y=(y_0, \ldots, y_{N-1})\in \mathbb{C}^N$ defines the N=L+K received symbols and $w\in \mathbb{C}^N$ the additive noise at the receiver. Transmit energy E can be assumed to be normalized, i.e., $\|x\|_2^2 = \sum_{k=0}^{K}|x_k|^2 = 1$.

Note that, contrary to the traditional setting of long data frames, the communications are consider here to be "one-shot" or "burst" communications, where only a single short-packet x will be transmitted. The next transmission might happen at some indefinite future time point so that previous channel knowledge is of no use. As can readily be appreciated, the techniques described herein can also be utilized to transmit long data frames and/or sequences of packets.

In many embodiments, the channel and noise can be modeled as independent circularly symmetric complex Gaussian random variables $$h_l \sim \mathcal{CN}(0,p^l) \text{ and } w_n \sim \mathcal{CN}(0,N_0) \quad (2)$$

where it is assumed with p≤1, i.e., an exponential decaying power delay profile (PDP)—see for example. The average received signal-to-noise ratio is therefore:

$$rSNR = \frac{\mathbb{E}[\|x*h\|_2^2]}{\mathbb{E}[\|w\|_2^2]} = \quad (3)$$

$$\frac{\sum_{k=0}^{K+L-1}\sum_{l=0}^{L-1}|x_{k-l}|^2\mathbb{E}[|h_l|^2]}{\mathbb{E}[\|w\|_2^2]} = \frac{\|x\|_2^2 \cdot \mathbb{E}[\|h\|_2^2]}{\mathbb{E}[\|w\|_2^2]} = \frac{\mathbb{E}[\|h\|_2^2]}{N \cdot N_0}.$$

Since the average energy of h is then given by $\mathbb{E}[\|h\|_2^2] = \sum_{l=0}^{L-1} p^l$, the following is obtained for p<1

$$\mathbb{E}[\|h\|_2^2] = \frac{1-p^L}{1-p} \text{ and } rSNR = \frac{1}{N \cdot N_0} \frac{1-p^L}{1-p}. \quad (4)$$

Any of a variety of channel models can be utilized in the design of a communication system that utilizes a MOZ scheme in accordance with various embodiments of the invention as appropriate to the requirements of a given application. As can readily be appreciated, the benefits of a MOZ scheme are likely to be most apparent in channels that exhibit multipath propagation.

Transmission Scheme Via Modulation on Zeros

Referring again to FIG. 2, modulators, in accordance with many embodiments of the invention, map by f each binary block $m \in \{0,1\}^B$ of B bits to a complex-valued discrete-time baseband signal $x \in \mathbb{C}^{K+1}$. Hereby, sender (transmitter) and receiver agree on at least one fixed zero-codebook $\mathscr{Z}$ which is a set of $2^B$ zero patterns of length K. Each zero can then be chosen from a set of cardinality $2^{B/K}$ which allows to encoded B/K bits. Each pattern defines then a polynomial X(z) of order K which is identified with the inverse z-transform to the normalized signal $x \in \mathbb{C}^{K+1}$. As is discussed further below, a variety of modulation schemes can be utilized based upon different zero patterns in $\mathscr{Z}$, which differ in complexity and performance.

The convolution in (1) can be represented by a polynomial multiplication. Let $x \in \mathbb{C}^{K+1}$ define the polynomial $X(z) = \sum_{k+0}^{K} x_k z^k$ for $z \in \mathbb{C}$, which has degree K if and only if $x_K \neq 0$. The received signal (1) in the z-domain is given by a polynomial of degree K+L−1

$$Y(z) = X(z)H(z) + W(z), \quad (5)$$

where X(z), H(z), and W(z) are the polynomials of degree K, L−1 and K+L−1 respectively generated by x, h and w. Any polynomial X(z) of degree K, can also be represented by its K zeros $\alpha_k$ and its leading coefficient $x_K$ as $$X(z) = x_K \prod_{k=1}^{K} (z - \alpha_k). \quad (6)$$

When x is normalized, $x_K$ is fully determined by its zeros $\alpha_k$, which define K degrees of freedom. The notation X(z) is commonly used for the z-transform or transfer function. However, since each polynomial of degree K with non-vanishing zeros corresponds to a unilateral (one-sided) z-transform with the same zeros and an additional pole at z=0, both "zero" representations above can be considered equivalent.

The multiplication by the channel polynomial H(z) adds at most L−1 zeros, say $\{\beta_l\}_{l=1}^{L}$, which may be arbitrarily distributed over the complex plane depending on the channel realization. However, for typical random channel models, it holds with probability one that the channel and signal polynomials, generated by a finite codebook set $\mathscr{C} \subset \mathbb{C}^{K+1}$, do not share a common zero. The no common zero property is typically regarded as a necessary condition for blind deconvolution.

The high-level idea underlying the MOCZ modulation scheme is as follows. In the absence of noise, under the no common zero property the zeros of X(z) appear as zeros of Y(z)=X(z)H(z) no matter what the channel length or realization is. Thus, the zero structure of the transmitted signal goes through the channel "unaltered". This suggests the benefits of encoding the message on the zero structure of X(z). Accordingly, systems and methods in accordance with various embodiments of the invention encode data in the zeros of the z-transform of the transmitted signal.

Contrary to conventional modulation schemes, where usually each data symbol (coefficient), either in time or frequency domain, can be placed at any point in the complex plane, the K "zero-symbols" in the z-domain have to share the complex-plane. Hence, the modulation scheme typically involves partitioning the complex plane in MK disjoint (connected) decoding sets $\{\mathscr{D}_k^{(m)}\}_{k=1,m=0}^{K,M-1}$ and clustering them to K sectors (constellation domains) $\mathfrak{S}_k := \bigcup_{m=0}^{M-1} \mathscr{D}_k^{(m)}$ for k=1, 2, . . . , K of size M each. In many embodiments, exactly one zero $\alpha_k^{(m)}$ is associated with each set $\mathscr{D}_k^{(m)}$. In this way, K zero constellation sets of M zeros each ($\mathscr{Z}_k = \{\alpha_k^{(0)}, \ldots, \alpha_k^{(M-1)}\}$ for k=1, 2, . . . , K) are defined.

Modulation of data can be achieved by constructing codebooks by choosing a particular zero $\alpha_k$ from each $\mathscr{Z}_k$ and therefore constructing $M^K$ different zero vectors $\alpha = (\alpha_1, \ldots, \alpha_K) \in \mathscr{Z} = \mathscr{Z}_1 \times \ldots \times \mathscr{Z}_K \subset \mathbb{C}^K$. Such a zero-codebook $\mathscr{Z}$ allows one to encode K log M bits using a discrete-time baseband signal having zeros in its z-transform corresponding to a zero vector from the zero-codebook.

Figure 3:
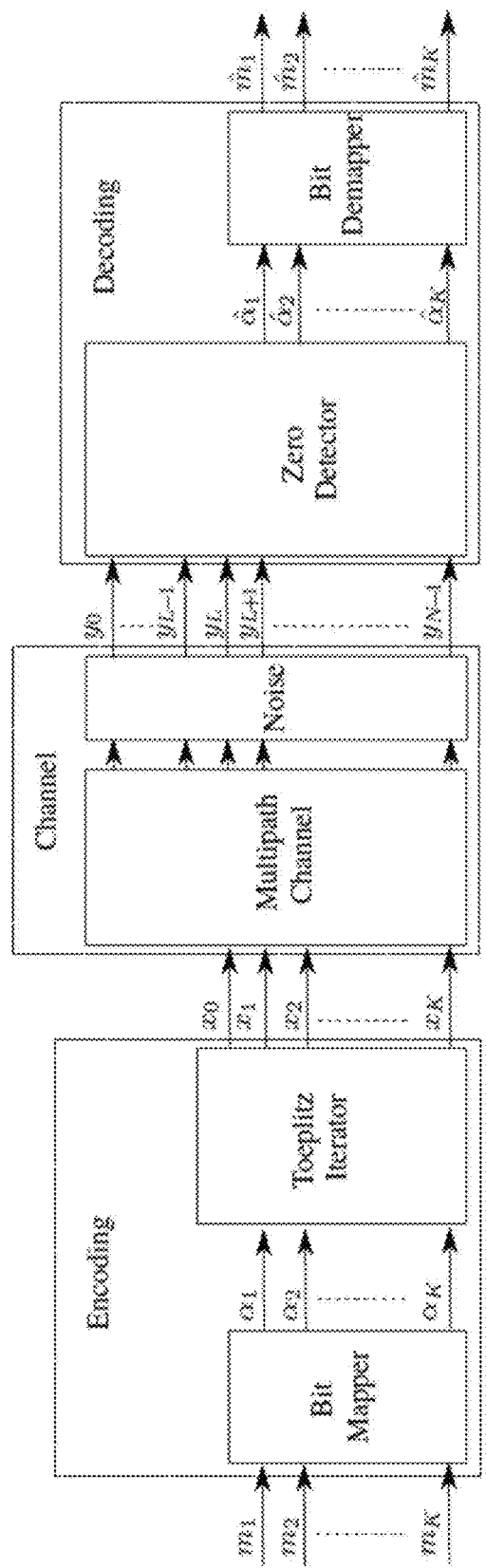
FIG. 3 conceptually illustrates a process for encoding and decoding data using Modulation on Zeros (MOZ) in accordance with an embodiment of the invention.

The message vector of an M-ary alphabet sequence can be partitioned into words $m=(m_1, \ldots, m_K)$ of length K and each letter $m_k$ is assigned to the kth zero-symbol $\alpha_k \in \mathscr{Z}_k$ and the decoder attempts to recover the message vector based upon the zeros of the detected signal. The process of encoding and decoding data in the manner described above using MOZ in accordance with an embodiment of the invention is conceptually illustrated in FIG. 3. While FIG. 3 includes specific implementation details, as is discussed further below various components can be utilized in the implementation of transmitters and receivers that utilize MOZ schemes as appropriate to the requirements of specific applications in accordance with various embodiments of the invention.

Note that in many embodiments, the zero constellation sets $\mathscr{Z}_k$ are ordered in the zero-codebook to enable a unique letter assignment. The zero vector $\alpha$ and the leading coefficient $x_K$ defines the vector x of polynomial coefficients. However, there are many methods to calculate the coefficients. In many embodiments, a computationally efficient method is utilized that exploits the Toeplitz structure of elementary convolutions with $\alpha_k = (-\alpha_k, 1)^T$ as $x = x_K \alpha_1 * \alpha_2 * \ldots * \alpha_K = x_K x_{K-1} * \alpha_K = x_K x_K$ which can be written iteratively as $$(7)$$

$$x_q = \begin{pmatrix} x_{q,0} \\ x_{q,1} \\ \vdots \\ x_{q,q} \end{pmatrix} = \begin{pmatrix} x_{q-1,0} & 0 \\ x_{q-1,1} & x_{q-1,0} \\ \vdots & \vdots \\ x_{q-1,q-1} & x_{q-1,q-2} \\ 0 & x_{q-1,q-1} \end{pmatrix} \begin{pmatrix} -\alpha_1 \\ 1 \end{pmatrix} = \begin{pmatrix} 0 \\ x_{q-1} \end{pmatrix} - \begin{pmatrix} \alpha_q x_{q-1} \\ 0 \end{pmatrix} = x_{q-1} * \alpha_q$$

for $q \in \{2, 3, \ldots, K\}$ and $x_1 = \alpha_1$. Note, this iterative process is also used in the Matlab function poly.

To obtain normalized signals $x_K$ can be set to $x_K = 1/\|x_K\|_2$. The matrix operation in (7) needs q multiplications and q−1 additions, which results in $1+(K^2-K)/2$ multiplications and $(K^2-K)/2$ additions for x, plus the normalizing which involves K−1 multiplications and K−1 additions more. Thus, a (K+1)-block codebook $\mathscr{C}$ of non-orthogonal signals (sequences) in the time-domain can be generated in polynomial time $O(K^2)$. Although much of the focus herein is singleshot transmission, for consecutive transmissions or a multiple user access a guard interval of length L−1 resulting in a transmit and receive block length of N=K+L taps can be utilized. Having introduced the general MOZ modulation approach, various communication systems that utilize Modulation on Conjugate-reciprocal Zeros (MOCZ) schemes and the benefits of such schemes are discussed below.

Modulation On Conjugate-Reciprocal Zeros (MOCZ)

In many embodiments, the MOZ modulation scheme involves the modulation of data using conjugate-reciprocal 2M-ary MOZ constellations. In several of these embodiments, the complex plane is partitioned into K sectors $\mathfrak{S}_k$ of arc width $2\pi/K$ containing distinct conjugate-reciprocal zero pairs ordered by increasing phase and radius $$\mathscr{Z}_k = \{\{(\alpha_k^{(1)}, 1/\overline{\alpha_k^{(1)}})\}, \{(\alpha_k^{(2)}, 1/\overline{\alpha_k^{(2)}})\}, \ldots, \{(\alpha_k^{(M)}, 1/\overline{\alpha_k^{(M)}})\}\}, \tag{8}$$

where it is assumed that w.l.o.g. $|\alpha_k^{(m)}|>1$. The above modulation scheme can be referred to as M-ary Modulation On Conjugate-reciprocal Zeros (MOCZ), pronounced as "Moxie". Thus, log M bits are encoded per zero and overall K log M bits are encoded on sequences of length K+1.

Figure 4A:
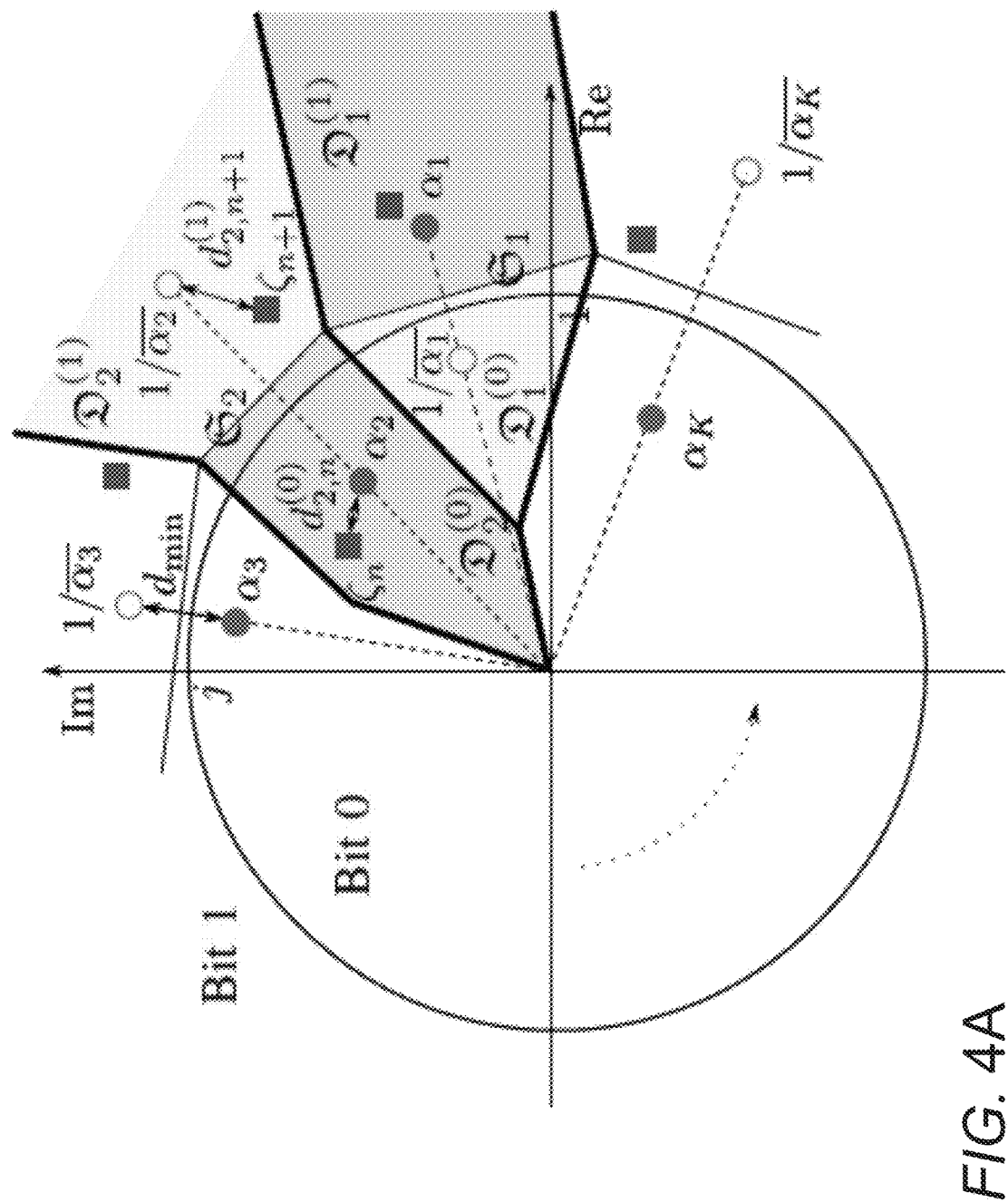
FIG. 4A conceptually illustrates the zeros of the z-transform of an arbitrary MOCZ scheme in accordance with an embodiment of the invention.

For M=2 this yields one bit per transmitted zero and hence K bits in the transmitted signal x, see FIG. 4A where the blue circles denote the zero pairs from the zero codebook $\mathscr{Z}$ and solid blue circles actual transmitted zeros and red squares received zeros, given by channel and data zeros. The zero-codebook $\mathscr{Z} := \{\overline{\alpha} \in \mathbb{C}^K | \alpha_k \in \{\alpha_k, 1/\overline{\alpha_k}\}, k=1, 2, \ldots, K\}$ is defined by K distinct conjugate-reciprocal zero pairs generated by a fixed zero-vector $\alpha = \{\alpha_k\}_{k=1}^{K} \in \mathbb{C}^K$ with zeros $\alpha_k = R_k e^{j\phi_k}$ outside the unit circle for some $R_k>1$ and ordered by their phases $\phi_1 < \phi_2 < \ldots < \phi_K$. Hence, the cardinality of $\mathscr{Z}$ is $2^K$. The encoding rule of the bit block can be given in the zero-domain by $$\tilde{\alpha}_k = e^{j\phi_k} \begin{cases} R_k & m_k = 1 \\ R_k^{-1}, & m_k = 0 \end{cases}, k = 1, 2, \ldots, K \tag{9}$$

The zero-codeword $\overline{\alpha}$ generates in the z-domain a polynomial of order K $$X(z) = \sum_{k=0}^{K} x_k z^k = x_K \prod_{k=1}^{K} (z - \tilde{\alpha}_k) \in \mathbb{C}[z]. \tag{10}$$

Taking the inverse z-transform $Z^{-1}$ of X(z) gives the discrete-time-codeword (symbol) $x \in \mathscr{C}$, where $x_K$ is chosen such that x is normalized in the $\ell_2$-norm. The time-codebook $\mathscr{C}$ or signal constellation set, is then the set of all normalized sequences of length K+1 with the same autocorrelation. This defines the Binary MOCZ modulator as $$f: \{0, 1\}^K \times \mathbb{C}^K \to \mathbb{C}^{K+1} \tag{11}$$

$$(m, \alpha) \mapsto f(m, \alpha) = Z^{-1}\left(x_K \prod_{k=1}^{K} \left(z - R_k^{2m_k-1} e^{j\phi_k}\right)\right) = x$$

In several embodiments. K ordered phases $\phi_1 < \phi_2 < \ldots < \phi_K$ and K radii $1 < R_1, R_2, \ldots, R_K$ can be chosen. A block $m \in \{0,1\}^K$ of K bits to $\alpha = (\alpha_1, \ldots, \alpha_K)^T$ can be encoded as conjugate-reciprocal zeros $$\alpha_k := \begin{cases} \alpha_k^{(1)} = R_k e^{j\phi_k}, & m_k = 1 \\ \alpha_k^{(0)} = R_k^{-1} e^{j\phi_k}, & m_k = 0 \end{cases}, k \in \{1, 2 \ldots, K\}, \tag{12}$$

which defines with (7) $x \in \mathbb{C}^{K+1}$, see FIG. 4A. This binary modulation scheme can be referred to $\mathbb{C}$ as a Binary Modulation On Conjugate-reciprocal Zeros (BMOCZ), pronounced "Bi-Moxie". For appropriate radii $R_k$ and phases $\phi_k$, these zero constellations exhibit remarkable robustness against additive noise.

If the radii and phases are chosen such that $R_k$=const and $\phi_k = 2\pi(k-1)/K$ for all k=1, 2, . . . , K, then x is called a Huffman sequence and the modulation scheme can be referred to Huffman BMOCZ encoding (see discussion below and FIG. 4B), otherwise the modulation scheme can be referred to an an Arbitrary BMOCZ encoding (see FIG. 4A). The bitrate for the BMOCZ scheme over an L multipath channel can be given as $$R_b = \frac{K}{K+L} \tag{13}$$

For an arbitrary BMOCZ zero-codebook $\mathscr{Z}$, the 2K zeros $\mathscr{Z}$ of the K pairs are then the zeros of an autocorrelation polynomial with coefficients $a = x * \overline{x^-} \in \mathbb{C}^{2K+1}$, where the leading coefficient $a_{2K}$ is such that $a_K=1$ (normalization of x). From this construction it follows that all such zero-encoded signals x have the same autocorrelation a. The codebook $\mathscr{C}$ is therefore defined by the $2^K$ non-trivial ambiguities x of the autocorrelation which allows one to encode K bits of information.

While specific MOCZ. BMOCZ, and Huffman BMOCZ schemes are described above, any of a variety of MOZ schemes including any cardinality, and/or with or without conjugate-reciprocal zeros in the Z-transforms of the transmitted signals can be utilized as appropriate to the requirements of specific applications in accordance with various embodiments of the invention. Systems and methods for decoding data transmitted via MOZ and MOCZ in accordance with various embodiments of the invention are discussed below.

Demodulation and Decoding Via Root-Finding and Minimum Distance

A variety of decoders can be implemented in accordance with different embodiments of the invention. Before discussing specific decoder implementations, it can be helpful to first explain in principle how to demodulate data transmitted using a MOZ scheme. The following discussion then provides a framework for discussing, specific efficient demodulation/equalization implementations.

At the receiver it can be observed by (1) in the z-domain a disturbed version of the transmitted polynomial $$Y(z) = \tag{14}$$

$$X(z) \cdot H(z) + W(z) = x_K h_{L-1} \prod_{k=1}^{K}(z - \alpha_k) \prod_{l=1}^{L-1}(z - \beta_l) + w_{N-1} \prod_{n=1}^{N-1}(z - \gamma_n)$$

where new channel zeros $\beta_l$ appear in addition to the transmitted zeros $\alpha_k$ of X(z) and both are perturbed by the noise polynomial W(z). From the received signal coefficients y, the zeros $\zeta_n$ of Y(z) can be computed using any of a variety of root finding algorithms.

The decoding can be performed in two steps: (i) $\zeta_n$ is assigned to sector $\mathfrak{S}_k$ if and only if for all k'

$$\min_m d(\zeta_n, \alpha_k^{(m)}) \le \min_m d(\zeta_n, \alpha_{k'}^{(m)}) \quad (15)$$

holds. Here $d(\cdot, \cdot)$ defines a distance on $\mathbb{C}$. Then, (ii) separation of data and channel zeros is done by minimum distance (MD) decision $$\hat{m}_k = \arg\min_{m \in \{1, \ldots, M\}} \min_{\alpha \in \mathfrak{D}_k} d(\alpha_k^{(m)}, \zeta_n), \quad k = 1, 2, \ldots, K. \quad (16)$$

The above approach can be abbreviated as the Root-Finding Minimal Distance (RFMD) decoder. For BMOCZ this is illustrated in FIG. 4A, where $d_{k,n}^{(m)} = d(\zeta_n, \alpha_k^{(m)})$ is used for m: =0, 1 with M=2. In many instances, only the (unweighted) Euclidean distance $d(x,y) = |x-y|$ is considered for RFMD, but other distance measures may be suitable as appropriate to the requirements of given applications.

The decoding sets $\mathfrak{D}_k^{(m)}$ are Voronoi cells of the zeros $\alpha_k^{(m)}$ with respect to the distance function d. In the case of a uniform distribution of the received zeros this can yield optimal performance in (16). If a sector contains multiple zeros, (16) will select the smallest distance, see FIG. 4A, where for k=2 the zero $\zeta_n$ is closer to $\alpha_2^{(0)}$ as $\zeta_{n+1}$ is to $\alpha_2^{(1)}$. If $\mathfrak{S}_k$ contains no zeros, $m_k$ can not be reliably decoded, resulting in an error. This decoding scheme differs therefore from conventional decoding, since more zeros are observed in a multipath channel at the receiver than were transmitted.

Autocorrelation Maximum-Likelihood Decoders

An Autocorrelation Maximum-Likelihood (AML) decoder is a maximum-likelihood decoder based on a fixed normalized autocorrelation codebook $\mathcal{C}$. The AML is then independent of the channel and gives the optimal estimation by $$\hat{x} = \arg\max_{x \in \mathcal{C}} y^* X (I_L + \sigma^{-2} X^* X)^{-1} X^* y \quad (17)$$

for additive noise power $\sigma^2$. Here $X \in \mathbb{C}^{N \times L}$ are the banded Toeplitz matrices generated by $x \in \mathbb{C}^{K+1}$ and $I_L$ is the L×L identity matrix.

While the discussion above relates to general decoders. Different decoder have different complexities, which might perform fast or very slow, and a certain error probability, depending on the used MOZ modulation scheme. Moreover, several estimation algorithms obtain a channel estimation which might be useful depending on the scenario. Specific sequences that can be utilized within BMOCZ schemes that enable the use of simple practical decoders and the characteristics of those decoders in accordance with many embodiments of the invention are discussed further below.

Huffman BMOCZ

A BMOCZ scheme can be applied to any autocorrelation sequence $a = x^* \overline{x} \in \mathbb{C}^{2K+1}$ generating a polynomial with simple zeros (all zeros are distinct). However, among these autocorrelations $a = \{a_k\}_{k=0}^{2K}$, Huffman autocorrelations described in Huffman, D., 1962. The generation of impulse-equivalent pulse trains. *IRE Transactions on Information theory.* 8(5). pp. 10-16, the disclosure of which is incorporated by reference herein in its entirety, have beneficial impulsive characteristics, since the Huffman sequences are "almost" white. For a given peak-to-side-lobe (PSL) $\eta \in (0,$ ½), all coefficients are zero except for the side-lobes $a_0 = a_{2K} = -\eta$ and the mainlobe $a_K = 1$. Hence, such an autocorrelation generates the polynomial (or power spectral density):

$$A(z) = -\eta + z^K - \eta z^{2K} \text{ and } A(e^{j2\pi\omega}) = 2\eta \cos(2\pi K\omega) + 1. \quad (18)$$

Since $\eta < \frac{1}{2}$ the z-transform $A(z)$ has no zeros on the unit circle. Taking $A(z)=0$ as a quadratic equation in $z^K$, one can immediately determine all the zeros $\alpha_k = R_k e^{j\phi_k}$ by $$R_k = R^{\pm 1} = \left( \frac{1 \pm \sqrt{1 - 4\eta^2}}{2\eta} \right)^{1/K}, \quad (19)$$

$$\phi_k = 2\pi \frac{k-1}{K} \text{ for } k = 1, 2, \ldots, K.$$

The K conjugate-reciprocal zero pairs are uniformly placed on two circles with radii R>1 and $R^{-1}$, i.e., $\alpha_k \in \mathcal{Z}_k = \left\{ R e^{2\pi j \frac{k-1}{K}}, R^{-1} e^{2\pi j \frac{k-1}{K}} \right\}$.

Figure 4B:
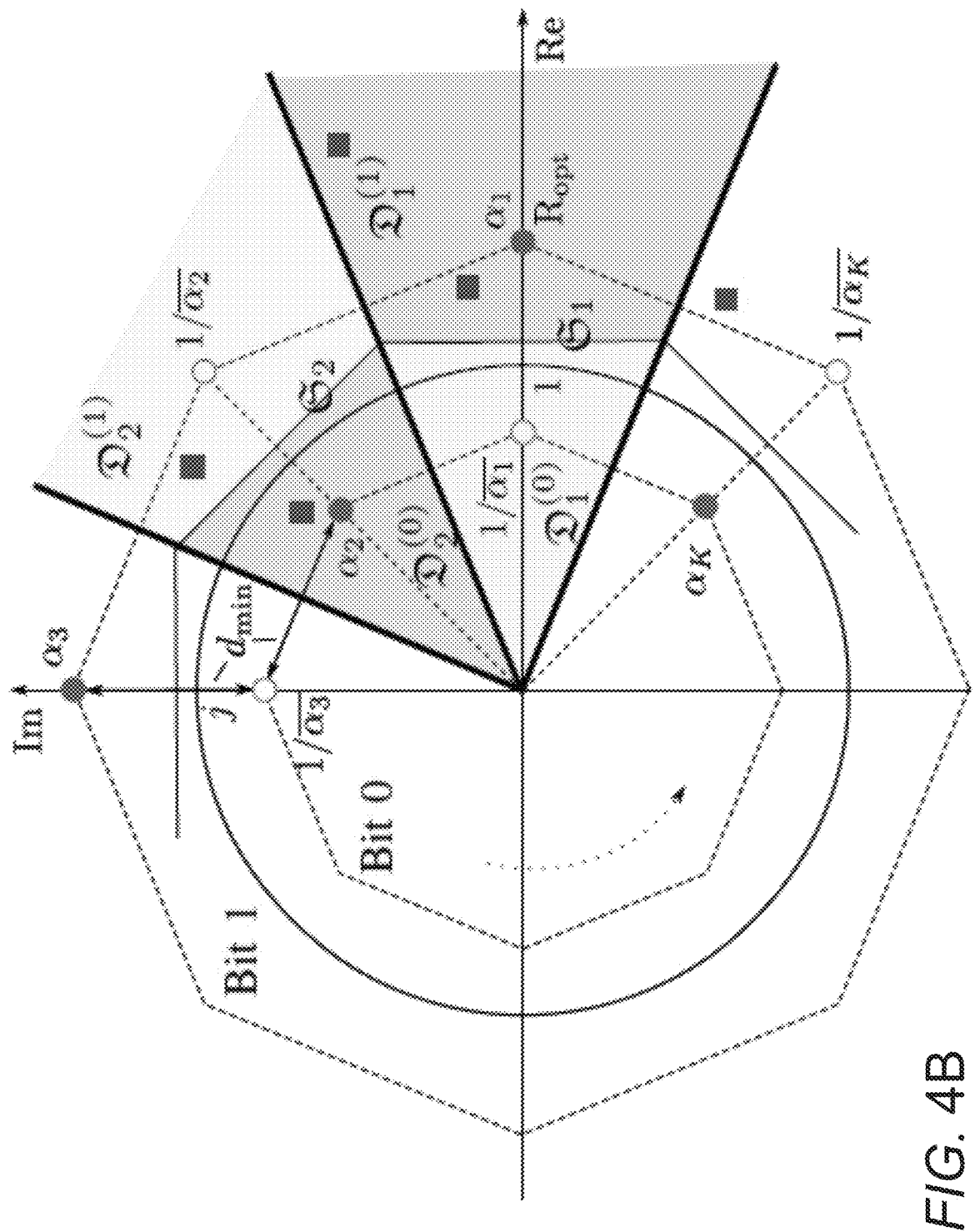
FIG. 4B conceptually illustrates the zeros of the z-transform of a Huffman Binary Modulation on Conjugate-reciprocal Zeros (BMOCZ) scheme in accordance with an embodiment of the invention.

The zeros are vertices of two regular polygons, centered at the origin, see FIG. 4B. The blue circles in FIG. 4B denote the conjugate reciprocal zero pairs from the zero codebook $\mathcal{Z}$ that are uniformly placed on the two circles with radii R>1 and $R^{-1}$, the solid blue circles indicate the actual transmitted zeros, and red squares received zeros, given by channel and data zeros. Expressing (18) by its zeros, gives $$A(z) = \quad (20)$$
$$-\eta \prod_{k=1}^{K} (z - \alpha_k)(z - \overline{\alpha_k^{-1}}) = x_K \prod_{k=1}^{K} (z - \alpha_k) \cdot \overline{x_0} \prod_{K=1}^{K} (z - \overline{\alpha_k^{-1}}) = X(z) \cdot X^*(z),$$

where $X^*(z) = \Sigma_k \overline{x_{K-k}} z^k$ is the conjugate-reciprocal polynomial generated by $\overline{x}$. Each such $X(z)$ respectively $X^*(z)$ is called a Huffman polynomial and their coefficients a Huffman sequence. Since the autocorrelation is constant for each $\alpha \in \mathbb{C}^K$ the following identity can be obtained $$\prod_{k=1}^{K} \alpha_k = \prod_k R^{2m_k - 1} e^{j2\pi \frac{(k-1)}{K}} =$$
$$R^{2\|m\|_1 - K} e^{j2\pi \frac{\sum_{k=1}^{K-1} k}{K}} = R^{2\|m\|_1 - K} e^{j2\pi \frac{(K-1)K}{2K}} = R^{2\|m\|_1 - K} (-1)^{K-1},$$

$\overline{x_0} x_K = -\eta$, and $x_K (-1)^K \Pi_k \alpha_k = x_0$, which is obtained by comparing the coefficients with the polynomials in (20) respectively $X(z) = x_K \Pi (z - \alpha_k)$, the relation $$|x_K|^2 = \frac{\eta}{(-1)^{K-1} \prod_k \alpha_k} \Leftrightarrow x_0 = e^{j\phi_0} \sqrt{\eta} R^{\|m\|_1 - \frac{K}{2}}, \quad (21)$$

$$x_K = -e^{j\phi_0} \sqrt{\eta} R^{\frac{K}{2} - \|m\|_1}$$

for a message $m = (m_1, \ldots, m_K)$ with a global phase $\phi_0$. By rewriting $\eta$ in terms of the radius $\eta = 1/(R^K + R^{-K})$ and setting $\phi_0 = 0$, the first and last coefficients of the normalized Huffman sequence x simplifies to $$x_0 = \sqrt[K]{R^{2\|m\|_1}/(1+R^{2K})} \text{ and } x_K = -\sqrt[K]{R^{-2\|m\|_1}/(1+R^{-2K})}. \tag{22}$$

This suggests, that the first and last coefficients of Huffman sequences are dominant if $1 \simeq R^K$, which will help for time synchronisation and detection of the channel length at the receiver. Moreover, if m is i.i.d. uniformly distributed we get by the binomial theorem $\mathbb{E}[|x_K|^2] = \mathbb{E}[|x_0|^2] = 2^{-K}(1+R^2)^K/(1+R^{2K})$. In fact, the magnitude of the first and last coefficients can be used for parity checks.

Impulse-like autocorrelations have also been used in radar. Hence, Huffman BMOCZ can be a promising approach for combined radar and wireless communication applications such as in vehicle-to-vehicle communication. As can readily be appreciated, the potential uses of Huffman BMOCZ schemes is only limited by the requirements of particular applications.

BMOCZ Maximum Likelihood Decoding

Efficient decoding techniques can be implemented for the BMOCZ scheme by explicitly relying upon a codebook $\mathscr{C}$ having a fixed autocorrelation property. The convolution in (1) can be written as $h*x = Xh$ where X is the N×L banded Toeplitz matrix having $(x_0, \ldots, x_K, 0, \ldots, 0) \in \mathbb{C}^N$ as its first column. The Toeplitz matrix $A \in \mathbb{C}^{K+1 \times K+1}$ generated by the autocorrelation a can also be introduced. If L=K+1 then $$A = X^*X = \begin{pmatrix} a_K & \cdots & a_0 \\ \vdots & \ddots & \vdots \\ a_{2K} & \cdots & a_K \end{pmatrix} \tag{23}$$

If L≤K, a L×L principal submatrix can be cut out of A and for L>K the submatrix can be filled up with zeros:

$$A_L = \begin{pmatrix} a_K & \cdots & a_{K-L} \\ \vdots & \ddots & \vdots \\ a_{K+L} & \cdots & a_K \end{pmatrix} \text{ for } L \leq K, \tag{24}$$

$$A_L = \begin{pmatrix} a_K & \cdots & a_0 & & 0 \\ \vdots & \ddots & \vdots & \ddots & \\ a_{2K} & \cdots & a_K & \cdots & a_0 \\ & \ddots & \vdots & \ddots & \vdots \\ 0 & & a_{2K} & \cdots & a_K \end{pmatrix} \text{ for } L > K.$$

The maximum likelihood (sequence) estimator (MLSE), can be given as:

$$\hat{x} = \arg\max_{x \in \mathscr{C}} p(y|x), \tag{25}$$

which determines the codeword x in the codebook $\mathscr{C}$ that maximizes the conditional probability. By assumption (2) the channel and noise are independent zero-mean Gaussian random variables, such that the received signal y=Xh+w in (1) will also be a complex Gaussian random vector with mean zero and covariance matrix $R_y = \mathbb{E}[yy^*]$. The probability for y under the condition that codeword x was transmitted is therefore $$p(y|x) = \frac{e^{-y^*R_y^{-1}y}}{\pi^N \det(R_y)}, \tag{26}$$

The covariance matrix of y is given by $$R_y = \mathbb{E}[Xhh^*X^*] + \mathbb{E}[Xhw^*] + \mathbb{E}[wh^*X^*] + \mathbb{E}[ww^*] = X$$
$$\mathbb{E}[hh^*]X^* + \sigma^2 I_N, \tag{27}$$

where the two middle terms vanish, since w and h are independent random variables with zero-mean. The PDP $p = (p^0, p^1, \ldots, p^{L-1})$ generates the channel covariance matrix $\mathbb{E}[hh^*] = D_p$, which is a L×L diagonal matrix with diagonal p, resulting in the covariance matrix $$R_y = N_0 I_N + X D_p X^*. \tag{28}$$

By setting $X_p := XD_p^{1/2} \in \mathbb{C}^{N \times L}$ equation (25) separates with (26) to $$\arg\max_x p(y|x) = \tag{29}$$
$$\arg\min_x \left( y^*(N_0 I_N + X_p X_p^*)^{-1} y + \log(\pi^N \det(N_0 I_N + X_p X_p^*)) \right).$$

By using Sylvester's determinant identity, the following expression is obtained $$\det(N_0 I_N + X_p X_p^*) = \det(N_0 I_L + X_p^* X_p) = \det(N_0 I_L + D_p^{1/2} A_L D_p^{1/2}) = \text{const.} \tag{30}$$

Hence, this term can be omitted in (29). By applying the Woodbury matrix identity $$y^*(N_0 I_N + X_p I_L X_p^*)^{-1} y = N_0 \|y\|_2^2 - N_0 y^* X_p (N_0 I_L + X_p^* X_p)^{-1} X_p^* y. \tag{31}$$

Since $\|y\|_2$ is positive and constant, the ML estimator simplifies to $\hat{x} = \arg\max_x y^* X_p (N_0 I_L + X_p^* X_p)^{-1} X_p^* y$. Inserting the diagonal power delay profile matrix results in $$\hat{x} = \arg\max_x y^* X D_p^{1/2} (N_0 I_L + D_p^{1/2} X^* X D_p^{1/2})^{-1} D_p^{1/2} X^* y = \tag{32}$$
$$\arg\max_x y^* X B^{-1} X^* y,$$

where $A_L \in \mathbb{C}^{L \times L}$ is given by (24) and $0 \preceq B = N_0 D_p^{-1} + A_L \in \mathbb{C}^{L \times L}$ is a matrix which reflects the codebook, power delay profile, and noise power and acts as a weighting for the projections of y to the shifted codewords. Hence, the Maximum Likelihood (ML) decoder becomes:

$$\hat{x} = \arg\max_x \|B^{-1/2} X^* y\|_2^2. \tag{33}$$

Note, for L=1 the ML reduces to the correlation receiver which solves $\max_x |x^*y|^2$ and BMOCZ becomes a $2^K$-ary non-orthogonal scheme. If L≤K and the codebook are the Huffman sequences, then $A_L = I_L$ and $B = D_b$ becomes a diagonal matrix with $b = N_0 p^{-1} + 1_L$. Hence, the result is a Rake receiver, where the weights for the lth finger (correlator) are given by $b_l^{-1} = (p^l + N_0)/N_0$, which reflects the sum power of channel gain and SNR of the lth path.

As can readily be appreciated, the maximum likelihood decoder described above can be implemented in hardware using an FPGA or DSP processor. Furthermore, the decoder could provide soft metrics to an outer code that can be utilized to perform error correction. While specific implementations of Maximum Likelihood decoders are described above, decoders utilized within communication systems that employ MOZ schemes are not limited to the use of ML decoders. A variety of practical decoders that can be utilized within communication systems that employ a number of MOZ schemes including (but not limited to) Huffman BMOCZ schemes in accordance with various embodiments of the invention are discussed below.

Weighted Direct Zero Testing (DiZeT) Decoders

In a number of embodiments, demodulation at a receiver is performed in one operation by evaluating each bit using the following demodulation rule, called weighted Direct Zero Testing (DiZeT), $$\hat{m}_k = \begin{cases} 0, & \omega_k^-|Y(\alpha_k)|^2 \le \omega_k^+|Y(1/\overline{\alpha_k})|^2 \\ 1, & \text{else} \end{cases} \quad (34)$$

$$k = 1, 2, \ldots, K$$

where the weights are given by the geometric series $$\omega_k^\pm = \sum_{n=0}^{N-1} |\alpha_k|^{\pm 2n} = \frac{1 - |\alpha_k|^{\pm 2N}}{1 - |\alpha|^{\pm 2}}, \quad (35)$$

$$k = 1, 2, \ldots, K$$

and called therefore geometric weights (GW). The GWs are independent on the rSNR and the channel realizations. The only assumption is the length L of the channel impulse response h which yields to the received dimension N=K+L. Other weights ω are also possible and might depend on the chosen zero-modulation used in $\mathscr{Y}$ as well as the channel and noise parameters. However, the receiver has the possibility to estimate the channel length and stop the sampling at N taps if the magnitude falls below a certain noise level. The transmitter needs to append to each transmitted symbol x a guard time of length L−1 to avoid ISI at the receiver if successive symbol or multiple user transmission is used. DiZeT decoders in accordance with a number of embodiments of the invention are discussed further below with respect to the specific example of communication systems that utilize Huffman BMOCZ schemes.

Direct Zero Testing Decoder for Huffman BMOCZ

Huffman sequences not only allow a simple encoding by its zeros, but also a simple decoding, since the autocorrelations of the sequences are by design highly impulsive-like autocorrelations. By setting $\eta=(0_K,\eta 1_{K-L})^T \in \mathbb{C}^L$ for L>K, (18) provides the autocorrelation $$A_L = X^*X = \begin{cases} I_L, & L \le K \\ I_L - \eta\delta_1^* - \delta_1\eta^*, & L > K \end{cases}. \quad (36)$$

Considering the case L≤K, $B=D_b=D_b X^*X$ is obtained. If and only if $D_b = bI_L$ for some b≠0, i.e., if either $N_0 \to \infty$ (high SNR) or p∼1 (constant power delay profile), the orthogonal projector $P=b^{-1}X(X^*X)^{-1}X^*$ onto the range of X can be identified in (32) to obtain with the left null space V of X the identity $P=I_N-V(V^*V)^{-1}V^*$. A K×N generalized Vandermonde matrix generated by the zeros of X(z) can be defined as $$V_\alpha^* = \begin{pmatrix} 1 & \alpha_1 & \alpha_1^2 & \cdots & \alpha_1^{N-1} \\ 1 & \alpha_2 & \alpha_2^2 & \cdots & \alpha_2^{N-1} \\ \vdots & & & & \vdots \\ 1 & \alpha_K & \alpha_K^2 & \cdots & \alpha_K^{N-1} \end{pmatrix}. \quad (37)$$

Since each zero is distinct, the Vandermonde matrix has full rank K. Then, each complex-conjugated column is in the left null space of the matrix X. More precisely $$V_\alpha^* X = \begin{pmatrix} X(\alpha_1) & \alpha_1 X(\alpha_1) & \cdots & \alpha_1^{L-1} X(\alpha_1) \\ X(\alpha_2) & \alpha_2 X(\alpha_2) & \cdots & \alpha_2^{L-1} X(\alpha_2) \\ \vdots & & & \vdots \\ X(\alpha_K) & \alpha_K X(\alpha_2) & \cdots & \alpha_K^{L-1} X(\alpha_K) \end{pmatrix} = 0 \Leftrightarrow X^* V_\alpha = 0. \quad (38)$$

In fact, the dimension of the left null space of X (null space of X*) is exactly K for each X generated by $x \in \mathscr{C}$, since it holds N=L+K=rank(X*)+nullity(X*), where rank(X)=rank(X*)=L and the shifts of x are all linear independent for any x≠0. Hence, $$y^*X(X^*X)^{-1}X^*y = y^*(I_N - V_\alpha(V_\alpha^*V_\alpha)^{-1}V_\alpha^*)y = \|y\|_2^2 - \|(V_\alpha^*V_\alpha)^{-1/2}V_\alpha^*y\|_2^2 \quad (39)$$

which yields with the weighting matrix $M_\alpha=(V_\alpha^*V_\alpha)^{-1/2}$ and the fact that y is fixed to $$\arg\max_\alpha p(y \mid x(\alpha)) = \arg\min_\alpha \|(V_\alpha^*V_\alpha)_2^{-1/2}V_\alpha^*y\|^2 = \arg\min_\alpha \|M_\alpha V_\alpha^*y\|_2^2. \quad (40)$$

The last minimization in (40) describes the ML estimator as a joint search over the K-zeros of the sequence and turns it into an MLSE over zero-sequences. In what follows an approximation is described that allows a receiver in accordance with an embodiment of the invention to search over each zero independently. For Huffman zeros, $\alpha_k = R_k e^{j2\pi(k-1)/K}$ with $R_k \in \{R, R^{-1}\}$, which yields the following $$V_\alpha^* V_\alpha = \begin{pmatrix} 1 & \alpha_1 & \cdots & \alpha_1^{N-1} \\ \vdots & & & \vdots \\ 1 & \alpha_K & \cdots & \alpha_K^{N-1} \end{pmatrix} \begin{pmatrix} 1 & \cdots & 1 \\ \overline{\alpha_1} & \cdots & \overline{\alpha_K} \\ \vdots & & \vdots \\ \overline{\alpha_1}^{N-1} & \cdots & \overline{\alpha_K}^{N-1} \end{pmatrix} = \begin{pmatrix} c_{1,1} & c_{1,2} & \cdots & c_{1,K} \\ c_{2,1} & c_{2,2} & \cdots & c_{2,K} \\ \vdots & & \ddots & \vdots \\ c_{K,1} & c_{K,2} & \cdots & c_{K,K} \end{pmatrix}, \quad (41)$$

where $$c_{k,m} = \sum_{n=0}^{N-1} (\alpha_k \overline{\alpha_m})^n = \sum_{n=0}^{N-1} (R_k R_m)^n e^{j2\pi n \frac{(k-m)}{K}}$$

and in particular $$c_{k,k} = \frac{1 - R_k^{2N}}{1 - R_k^2}.$$

In expectation, for uniform bit sequences. $\mathbb{E}[R_k R_m] \approx 1$ for k≠m and hence for N=lK the off-diagonals are roughly vanishing, since $\Sigma_{n=0}^{K-1} e^{j2\pi n(k-m)/K}=0$. Hence, (41) can be approximated with $\omega(|\alpha_k|)=c_{k,k}^{-1/2}$ as a diagonal matrix $$M_\alpha \approx \text{diag}(\omega(|\alpha_1|), \ldots, \omega(|\alpha_K|)). \quad (42)$$

By observing that $V_\alpha^* y = (Y(\alpha_1) \ldots Y(\alpha_K))^T$, the exhaustive search of the ML in (40) simplifies to independent decisions for each zero symbol $$\hat{\alpha}_k := \underset{\alpha_k \in \{R, R^{-1}\} e^{j2\pi(k-1)/K}}{\operatorname{argmin}} |\omega(|\alpha_k| Y(\alpha_k)|. \tag{43}$$

This gives the Direct Zero Testing (DiZeT) decoding rule for $k \in \{1, \ldots, K\}$ $$\hat{m}_k = \frac{1}{2} + \frac{1}{2} \operatorname{sign}\left(R^{N-1} \left| Y\left(R^{-1} e^{j2\pi \frac{k-1}{K}}\right)\right| - \left| Y\left(R e^{j2\pi \frac{k-1}{K}}\right)\right|\right) \tag{44}$$

since it hold $$\sqrt{\frac{1-R^{2N}}{1-R^{-2N}} \frac{1-R^{-2}}{1-R^2}} = R^{N-1}.$$

If $L \geq K+1$, $A_L \approx I_L$. Then the same approximation yields to the same DiZeT decoder.

Geometrical Interpretation: The DiZeT decoder in (34) tests each conjugate-reciprocal pair of zeros $\{R^{\pm 1} e^{j2\pi(k-1)/K}\}$ to see which is more likely a zero of Y(z). It does so by evaluating the polynomial Y(z) at these two zeros and by scaling them by $\omega(|z|)$. In many embodiments, the scaling is necessary because polynomials scale exponentially in $|z|$. This scaling can be used as a general rule of thumb for zero-patterns other than Huffman BMOCZ. The DiZeT decoder can be readily implemented using an FPGA or Digital Signal Processor to process digital output from an analog to digital conversion of the received signal (either directly or following mixing down to an intermediate frequency or baseband).

While specific implementations of DiZeT decoders are described above, it should be readily appreciated that a variety of decoder implementations that decode the received signal by determining which of the conjugate-reciprocal pairs of zeros is present in the z-transform of the transmitted signal can be utilized as appropriate to the requirements of a given application in accordance with various embodiments of the invention including (but not limited to) various implementations discussed below. Furthermore, communication systems that utilize Huffman BMOCZ schemes in accordance with several embodiments of the invention can utilize any of a variety of alternative decoders including (but not limited to) ML decoders and/or any of the various other types of decoders described and/or incorporated by reference herein.

FFT Implementation of the DiZeT Decoder for Huffman BMOCZ

The DiZeT decoder for Huffman MOCZ allows a simple hardware implementation at the receiver. Assume two copy's of the received samples $y_n$. One is scaled with the positive radius $R^n$ and the other with $R^{-n}$, i.e., we apply to y the diagonal matrix $$D_{R^{\pm 1}} := \operatorname{diag}(1, R^{\pm 1}, \ldots, R^{\pm(N-1)}),$$

and apply afterwards the QK-point unitary IDFT matrix $F^*$ on the $\tilde{N}$ zero-padded signal, with $Q := \lceil N/K \rceil$ and $\tilde{N} = QK - N$, the following is obtained with $$\tilde{D}_R = \begin{pmatrix} D_R & 0_{N \times \tilde{N}} \end{pmatrix}^T$$

$$\sqrt{QK} F^* \tilde{D}_R y = \begin{pmatrix} \sum_{n=0}^{N-1} y_n R^n e^{j2\pi \frac{0 \cdot n}{QK}} \\ \vdots \\ \sum_{n=0}^{N-1} y_n R^n e^{j2\pi \frac{(QK-1) \cdot k}{QK}} \end{pmatrix} =: Y(\alpha_Q^{(1)}), \tag{45}$$

$$\sqrt{QK} F^* \tilde{D}_{R^{-1}} y = Y(\alpha_Q^{(0)}),$$

where $$\alpha_{Q,k}^{(m)} = \alpha_k^{(m)} [e^0, \ldots, e^{j2\pi(Q-1)/QK}] \in \mathbb{C}^Q.$$

Then the decoding rule (44) becomes $$\hat{m}_k = \frac{1}{2} + \frac{1}{2} \operatorname{sign}\left(R^{N-1} \left|\left(F^* \tilde{D}_{R^{-1}} y\right)_{Q(k-1)}\right| - \left|\left(F^* \tilde{D}_R y\right)_{Q(k-1)}\right|\right), \tag{46}$$

$$k = 1, \ldots, K.$$

Here, $Q \geq 2$ acts as an oversampling factor of the IDFT, with each Qth sample utilized by the decision rule. Hence, the decoder can be fully implemented by a simple IDFT from the delayed amplified received signal by using for example an FPGA, a DSP, or even analog front-end circuitry of a type that is conventional in many current receivers. As noted above, the principles utilized in the construction of the decoders described above are not limited to binary MOZ schemes. The discussion that follows considers the manner in which M-ary Huffman MOCZ schemes can be utilized within communication systems in accordance with various embodiments of the invention.

Combined Channel Estimation and Decoding

Systems and methods in accordance with a number of embodiments of the invention are capable of performing blind channel estimation and decoding. A number of processes can be utilized to perform an reconstruction/estimation $\hat{x}$ of the transmitted symbol. From the estimated signal $\hat{x}$ the same decoders as above can be used to decode the bits. If the Huffman sequences are used, an estimation of the channel covariance (autocorrelation) is possible, by using the zero-forcing equalization (frequency-domain-equalization) on the autocorrelation $$\hat{a}_h = F^*(Fa_y / Fa_x) = F^*\left(\left[F\begin{pmatrix} a_x \\ 0_{2L-2} \end{pmatrix} \cdot F\begin{pmatrix} a_h \\ 0_{2K} \end{pmatrix} + F\tilde{w}\right] / F\begin{pmatrix} a_x \\ 0_{2L-2} \end{pmatrix}\right) \tag{47}$$

where $a_x$, $a_y$, and $a_h$ are the autocorrelation of x, y, and h respectively, given by $$(a_x)_{l+K} = \sum_{k=0}^{K} x_k \overline{x_{k+l}}, \, l = -K, \ldots -1, 0, 1, \ldots, K. \tag{48}$$

Moreover, F denotes the unitary $2N-1 \times 2N-1$ Fourier matrix. The notation • refers to element-wise multiplication and/to element-wise division. Note, $\tilde{w}$ is colored noise. This approach can also be used for other autocorrelations as long as the Fourier matrix of their autocorrelations is non-vanishing.

Semi-Definite-Program (SDP) via Channel Covariance

Using the linear measurement map $\mathcal{A}$ on N×N→$\mathbb{C}^{4N-4}$ provides the following measurements $$b := \mathcal{A}(zz^*) = \begin{pmatrix} a_x \\ a_y \\ y \\ \overline{y} \end{pmatrix} \quad (49)$$

where $z=[x,h]^T \in \mathbb{C}^N$. The convex optimization problem $$\text{find } X \succeq 0 \text{ s.t. } \mathcal{A}(X)=b \quad (50)$$

has then a unique solution $\hat{Z}$. Obtaining by an SVD the best rank-1 approximation $\hat{z}$ yields to the estimation of the channel h and signal $\hat{x}$ up to a global phase $e^{j\theta}$.

Wirtinger-Flow Process Via Channel Covariance

The equivalent non-convex optimization problem is given by minimizing $$F(z) = \| \mathcal{A}(zz^*) - b \|_2^2. \quad (51)$$

over all $z \in \mathbb{C}^N$. The Wirtinger derivative can be derived as follows, $$\nabla F(z) = \nabla \| A\text{vec}(zz^*) - b \|_2^2 = \nabla \| A(z \otimes I_N)z - b \|_2^2$$
$$= (z^T \otimes I_N) A^* (A\text{vec}(zz^*) - b),$$

where $\otimes$ is the Kronecker matrix product. The matrix A is the matrix version of the linear map $\mathcal{A}$.

Then the problem (51) can be solved by a gradient decent algorithm shown in FIG. 5 and a backtracking line search algorithm shown in FIG. 6. The parameters $z^{(0)}$, c, $\eta_0$, $\beta$ are chosen manually.

If the transmitted data is decoded by the DiZeT decoder or any other proposed decoder, an estimate of the transmitted signal $\hat{x}$ can be obtained by the receiver with the knowledge of the encoder f, which then can be used to estimate the channel h for example by a frequency-domain-equalization as $$\hat{h} = P_L \left( F^* \left( Fy/F \begin{pmatrix} \hat{x} \\ 0_{N-K} \end{pmatrix} \right) \right) \quad (52)$$

where $P_L$ projects on the first L coefficients. Note, that $\hat{x} \in \mathscr{C}$ and has therefore no zeros on the unit circle such that the discrete Fourier transform F of the zero padded vector $\hat{x}$ has full support. For a fixed L, the estimation quality will increase if K increases. If L>K then no zero-padding of $\hat{x}$ is necessary.

Hybrid MOZ/OFDM Systems

In a number of embodiments. MOZ schemes are utilized by hybrid systems in which an initial communication is exchanged between a transmitter and a receiver using a MOZ scheme. From the initial communication, the receiver and the transmitter (if duplex communication is used) can determine the characteristics of the channel (reciprocity in duplex mode) and this channel characteristic can then be utilized to transition to coherent OFDM or other modulation methods which are more suitable and efficient for longer-packet transmissions. Stated another way, the communication system utilizes a MOZ scheme to perform an initial bootstrap and, once the communication system has determined a channel model, the transmitter and receiver can switch over to an OFDM communication scheme. Here, the channel learning period can be much shorter than in classical OFDM systems, see (52), whereby at the same time digital data can be communicated between transmitter and receiver in a duplex communication mode.

Although a variety of channel estimation techniques are described above, it should be readily appreciated that communication systems that utilize MOZ schemes in accordance with various embodiments of the invention are by no means limited to particular decoder implementation and/or channel estimation techniques. Systems and methods that are suitable for the transmission and decoding of a variety of higher order MOZ schemes in accordance with several embodiments of the invention are discussed below.

Higher Order Modulations for MOCZ

As noted above, higher order modulation schemes can be constructed for MOCZ for M>1, by combining Huffman codebooks. The following discussion presents two 2M-ary MOCZ schemes that are implemented by quantizing the radius or the phase positions in each of the K sectors, which can be seen as combining rotated or scaled Huffman zero-codebooks. Hence, the number of transmitted zeros and, therefore, the block length K+1 will not change.

M-Phase MOCZ

A Huffman zero-codebook is defined by K uniform phase positions, where for each phase either the zero inside or outside the unit circle is selected. By quantizing the k-th sector $\mathfrak{S}_k$ uniformly in M phase positions $$\frac{2\pi(k-1)}{K} + \frac{2\pi m}{MK} \text{ for } m \in [M],$$

an additional log M bits can be decoded per zero. The encoding rule is then given for a block message m of length K, where $m_k = [c_k, b_k]$ is a binary word of length log 2M, where the first bit $c_k$ is separated from the other log M bits in $b_k$. The first bit is encoded on the radius and the other log M bits on the phase:

$$m_k \mapsto \alpha_k = R^{1-2c_k} e^{j2\pi \frac{(k-1)M + \sum_{l=1}^{\log M} b_{k,l} 2^{\log M - 1}}{MK}}, k=1, \ldots, K. \quad (53)$$

Figure 7:
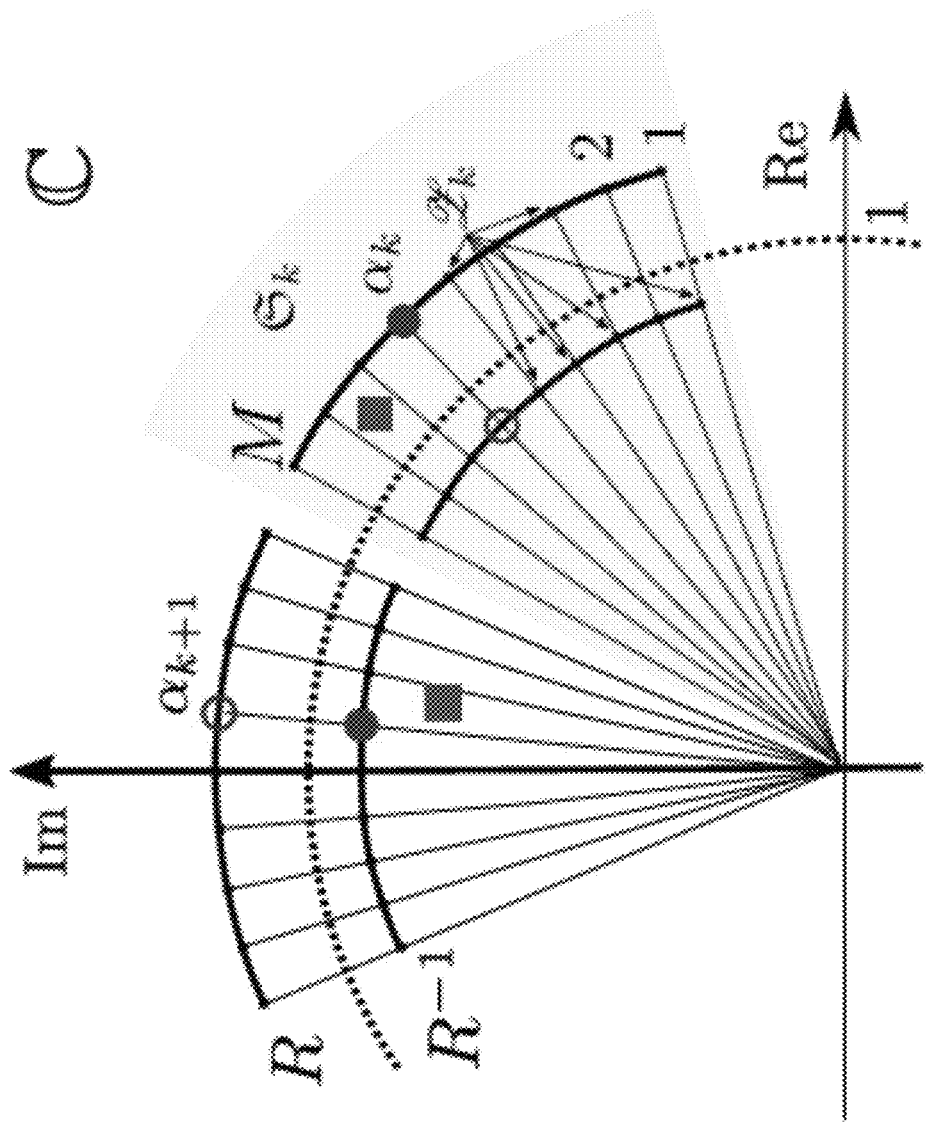
FIG. 7 conceptually illustrates the zeros of the z-transform of a M-ary Phase MOCZ (PMOCZ) scheme in accordance with an embodiment of the invention.
Figure 8:
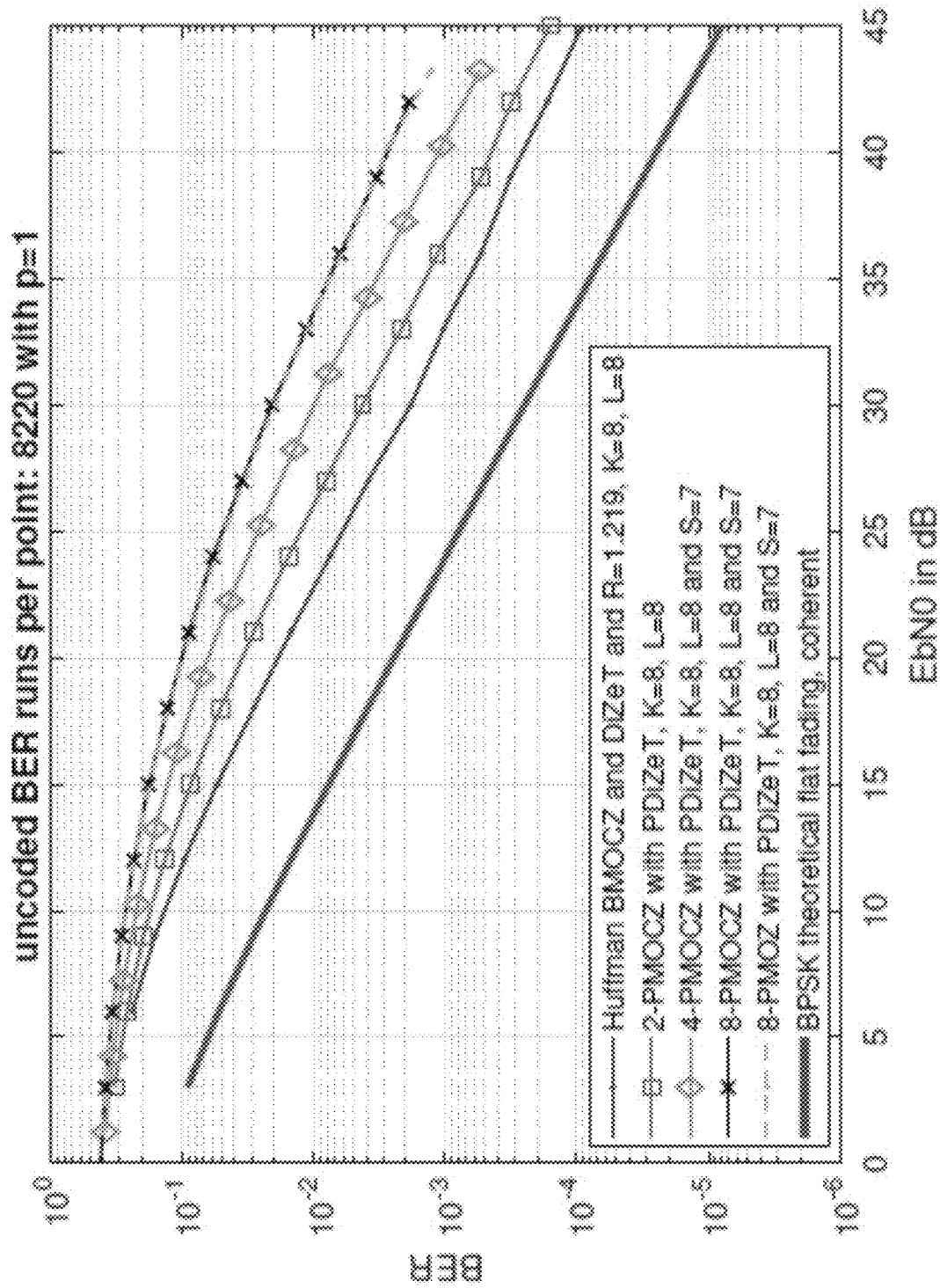
FIG. 8 is a chart showing the BER performance of a M-ary PMOCZ scheme in accordance with various embodiments of the invention for M=1, 2, 4 over received $E_b/N_0$.

See FIG. 7 for a schematic illustration in which the encoding of a first bit on the radius is indicated by blue circles, and the encoding of an additional log M bits is shown as phase slices from 1, ..., M. The location of the zeros of the received signal are indicated by red squares. Note, bit splitting is utilized, since a mismatch of inside or outside the unit circle, will only affect the first bit and not the phase bits. Although, the polynomial coefficients will not have a perfect autocorrelation matrix $X^*X=1_K$, for K≤L the DiZeT decoder can still be utilized to decide for the 2M zero positions of the kth zero-symbol $$\hat{c}_k = \frac{1}{2} + \frac{1}{2} \text{sign} \left( R^{N-1} \left| Y \left( R^{-1} e^{j2\pi \frac{kM + \hat{m}_k}{MK}} \right) \right| - \left| Y \left( R e^{j2\pi \frac{kM + \hat{m}_k}{MK}} \right) \right| \right), \quad (54)$$

$$\hat{b}_k = De2Bi(\hat{m}_k) \text{ with } \hat{m}_k \text{argmin}_{m \in [M]}$$

$$\left\{ \min \left\{ \left| Y \left( Re^{j2\pi \frac{(k-1)M+m}{MK}} \right) \right|, R^{N-1} \left| Y \left( R^{-1} e^{j2\pi \frac{(k-1)M+m}{MK}} \right) \right| \right\} \right\}$$

and De2Bi denotes the decimal-to-binary map. Here, the assumption is made again that the kth symbol decision is independent of the other K−1 symbols. In FIG. 8, the BER performance for M=1, 2, 4 over received $E_b/N_0$ is plotted. Since on each circle there are MK uniformly spaced zero-positions, the radius in (66) is adapted to R=$\sqrt{1+(\log M-0.3)\sin(\pi/(MK))}$. As can readily be appreciated. BER performance can be improved through use of an error correcting outer code. In many embodiments, the code could be designed to provide greater error correction with respect to the phase bits. The specific outer code that is utilized is largely dependent upon the requirements of a given application.

M-Phase MOZ

If modulation on conjugate-reciprocal pairs is omitted by setting R=1, one bit of information is lost per zero-symbol and the modulation scheme becomes an M-ary Phase Modulation on Zeros (PMOZ). The encoder and decoder are the same by omitting $c_k$ and setting R=1. The BER performance is a little bit better than M-PMOCZ but worse than (M−1)-PMOCZ, which has the same bit-rate as M-PMOZ, see FIG. 8.

M-Radius MOCZ

Analogously, each zero-symbol over M radii can be quantized to obtain an M-Radius Modulation on Conjugated Zeros (RMOCZ) scheme. M radii can be chosen as $1 < R_0 < R_1 < \ldots < R_{M-1}$. Encoding can be performed as for a M-PMOCZ a message word m of K binary words $m_k$ each of log 2M bits $m_k=[c_k, b_k]$ to $$m_k \mapsto \alpha_k = R_{m_k}^{1-2c_k} e^{j2\pi \frac{k-1}{K}}, m_k = \sum_{l=1}^{\log M} b_{k,l} 2^{l-1}. \quad (55)$$

For decoding, the splitting decoder can be utilized $$\hat{c}_k = \frac{1}{2} + \frac{1}{2} \text{sign}\left(R_{\hat{m}_k}^{N-1} \left| Y\left(R_{\hat{m}_k}^{-1} e^{j2\pi \frac{k-1}{K}}\right)\right| - \left|Y\left(R_{\hat{m}_k}^{-1} e^{j2\pi \frac{k-1}{K}}\right)\right|\right), \quad (56)$$

$\hat{b}_k = De2Bi(\hat{m}_k)$ with $\hat{m}_k \text{argmin}_{m \in [M]}$ $\left\{\min\left\{\left|Y\left(R_m e^{j2\pi \frac{k-1}{K}}\right)\right|, R_m^{N-1} Y\left(R_m^{-1} e^{j2\pi \frac{k-1}{K}}\right)\right|\right\}\right\}$.

While a variety of higher order MOZ modulation schemes are described above, any of a variety of higher order MOZ schemes can be utilized as appropriate to the requirements of given applications including higher order MOZ schemes in which the phase and/or radii can be unevenly quantized based upon a variety of factors including (but not limited to) any of a number of appropriate capacity measures. The robustness of various MOZ schemes described above is discussed below.

For higher order modulations various bit mappings to the zero constellation points are possible, which can depend on the channel zero distribution, the noise distribution, as well as the constellation sets of the zero-codebook $\mathscr{Z}$. For M-ary PMOCZ a Gray labeling/coding can be used to encode the bits between the even spaced M conjugate-reciprocal zero pairs in the kth zero sector depictured in FIG. 7. Such a Gray labeling ensures that the next neighbor zeros only differ by one bit position, which is useful if the channel and noise zeros are uniformly distributed in an annulus around the unit circle.

It is also possible to exploit list-decoding and other soft-threshold decisions by using multiple received signals of the same transmit signal or by using error detection and error correcting codes. An error can be easily identified if for the kth transmitted zero two zeros are close to two different zero positions in $\mathscr{Z}_k$.

Continuity and Robustness of Zeros Against Small Perturbations

The robustness of various modulation schemes and decoder implementations based upon the characteristics of the channel and non-linearities within the communication system are now considered. Due to the nonlinear nature of the MOZ modulation, finding tight analytic expressions for the BER of MOZ and MOCZ, for the various decoders that can be implemented in accordance with certain embodiments of the invention can be challenging. To gain some insight into the problem, the stability of the single root-neighborhoods of each transmitted zero when the coefficient of the received polynomial are perturbed by additive noise is considered.

MOZ constitutes a new modulation scheme on the signal zeros that can be decoded using general decoders as well as a simple DiZeT decoder. For communication systems and methods in accordance with various embodiments of the invention to provide a robust recovery, and hence a reliable communication, zero-codebooks should be chosen in such a way that the patterns remain identifiable at the receiver in the presence of additive noise perturbing the polynomial coefficients. Since the mapping between the coefficients and zeros is highly non-linear, studying such robustness requires a delicate analysis. It can be shown, by polynomial perturbation analysis, that indeed zero-patterns exists which remain stable against additive noise.

Figure 9:
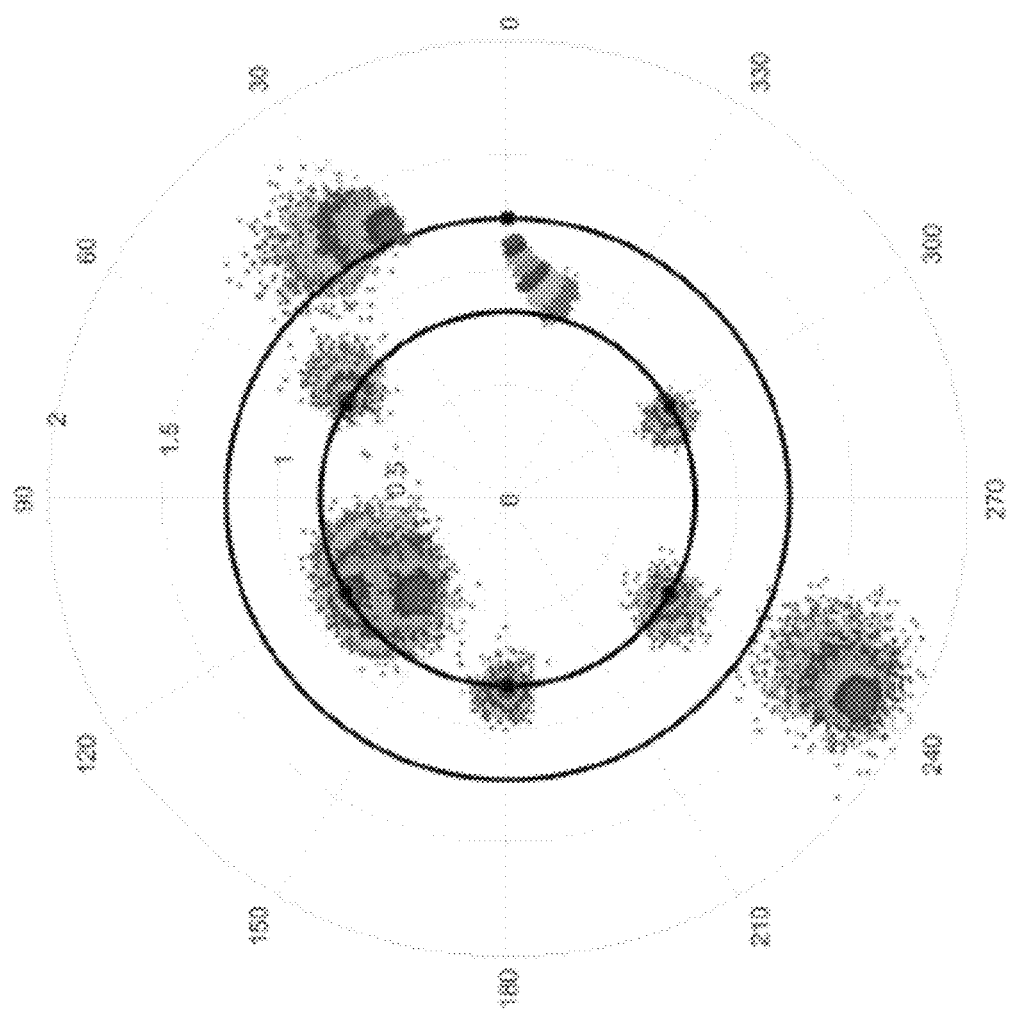
FIG. 9 is a plot showing simulation results of root neighborhoods for seven noise powers in the range of −22 dB to −5 dB, each with 1000 realizations, for a transmitted signal with a z-transform having six Huffman zeros (black square) and 3 channel zeros (red square) for R=1.225.

An analysis of the robustness of a codebook can be performed by considering the Euclidean norm and how much the zeros will be disturbed if the coefficients are perturbed with any $w \in \mathbb{C}^F$ having $\|w\|_2 \leq \varepsilon$ for some $\varepsilon > 0$. The answer can be given in terms of the root neighborhood or pseudozero set $$Z(\varepsilon, X) = \left\{ z \in \mathbb{C} \ \middle| \ \frac{\left|\sum_n x_n z^n\right|^2}{\sum_n |z|^{2n}} \leq \varepsilon^2 \right\} \quad (57)$$

of the polynomial X(z) for a coefficient perturbation with $\|w\|_2 \leq \varepsilon$. When $\varepsilon=0$, Z(0,X) is simply the set of N zeros of X(z) (assuming the zeros are distinct). As $\varepsilon$ increases Z($\varepsilon$,X) starts off as the union of N disjoint sets representing the neighborhood sets of the N distorted zeros of X(z). As $\varepsilon$ is further increased at some point the N single root neighborhood sets start to intersect each other, at which point additive perturbations to the coefficients of the polynomial result in a confusion of the zeros and in a possible error by the RFMD decoder (16). In FIG. 9, a plot is provided for a fixed polynomial with N=K=6 Huffman zeros (black squares) and L−1=3 channel zeros (red squares), and the distorted zeros obtained due to distortions by Gaussian random vectors with different noise powers from −22 dB to −5 dB. The additional channel zeros have only little impact on the root neighborhoods of the Huffman zeros. However, they can have a heavy impact on the zero separation (decoding), if they get close to the zero-codebook. Since the distribution of the channel zeros is random, only the perturbation analysis of a given polynomial X(z) is considered.

To derive such a quantized result, Rouché's Theorem can be exploited to bound the single root neighborhoods by discs. Specifically, Rouché's Theorem directs that by setting X(z) and W(z) to be analytic functions in the interior to a simple closed Jordan curve C and continuous on C. If $$|W(z)| \le |X(z)|, z \in C, \quad (58)$$

then $Y(z)=X(z)+W(z)$ has the same number of zeros interior to C as does $X(z)$.

The Theorem allows one to prove that the zeros $\alpha_n(x)$ of a given polynomial is a continuous function of its coefficients x. However, to obtain an explicit robustness result for the zeros of a given polynomial with coefficients x, a quantized version of the continuity is beneficial, i.e., a local Lipschitz bound of the zero functions with respect to the $\ell_\infty/\ell_2$ norm in a ε-neighborhood of x. As simple closed Jordan curves, the Euclidean circle and the disc can be considered as its interior, which will contain the single root neighborhoods. Define for $\alpha_n \in \mathbb{C}$ the closed Euclidean ball (disc) of radius $\delta > 0$ and its boundary as $$B_n(\delta)=B(\delta,\alpha_n)=\{z \in \mathbb{C} \mid |z-\alpha_n| \le \delta\}, \; C_n(\delta)=\{z \in \mathbb{C} \mid |z-\alpha_n|=\delta\}. \quad (59)$$

The arbitrary polynomial $X(z)=\Sigma_{n=0}^N x_n z^n$ of degree $N \ge 1$ can then be considered. If the coefficients are disturbed by $w \in B(\varepsilon,x)$, the maximal perturbation of the zeros should be bounded by $$\max_n |\alpha_n(x+w) - \alpha_n(x)| \le \delta \cdot \|x+w-x\|_2 = \delta \cdot \|w\|_2, \quad (60)$$

where the bound $\delta=\delta(\varepsilon,x)>0$ is the local Lipschitz constant. If $w_N=-x_N$, the leading coefficient of the perturbed polynomial will vanish, and $\alpha_N(x+w)$ can be set to 0, since the degree of the perturbed polynomial will reduce to N−1.

A maximal noise power bound can be proven for a given local Lipschitz bound of a certain class of polynomials. The proof relies on the assumption that one zero is outside the unit circle. This is not much of a restriction, since all but one of the $2^N$ Huffman polynomials have this property.

Theorem 1. Let $X(z) \in \mathbb{C}[z]$ be a polynomial of degree $N>1$ with coefficient vector $\|x\|_2=1$ and simple zeros $\alpha_1, \ldots, \alpha_N \subset \mathbb{C}$ inside a disc of radius $R=\arg \max_n |\alpha_n|>1$ with minimal pairwise distance $d_{min}:=\min_{n \ne k}|\alpha_n-\alpha_k|>0$. Let $w \in \mathbb{C}^N$ with $\|w\|_2 \le \varepsilon$ be an additive perturbation on the polynomial coefficients and $\delta \in [0,d_{min}/2)$. Then the nth zero $\zeta_n$ of $Y(z)=X(z)+W(z)$ lies in $B_n(\delta)$ if $$\varepsilon = \varepsilon(x,\delta) \le \frac{|x_N|\delta(d_{min}-\delta)^{N-1}}{\sqrt{1+N}(R+\delta)^N}. \quad (61)$$

Figure 12:
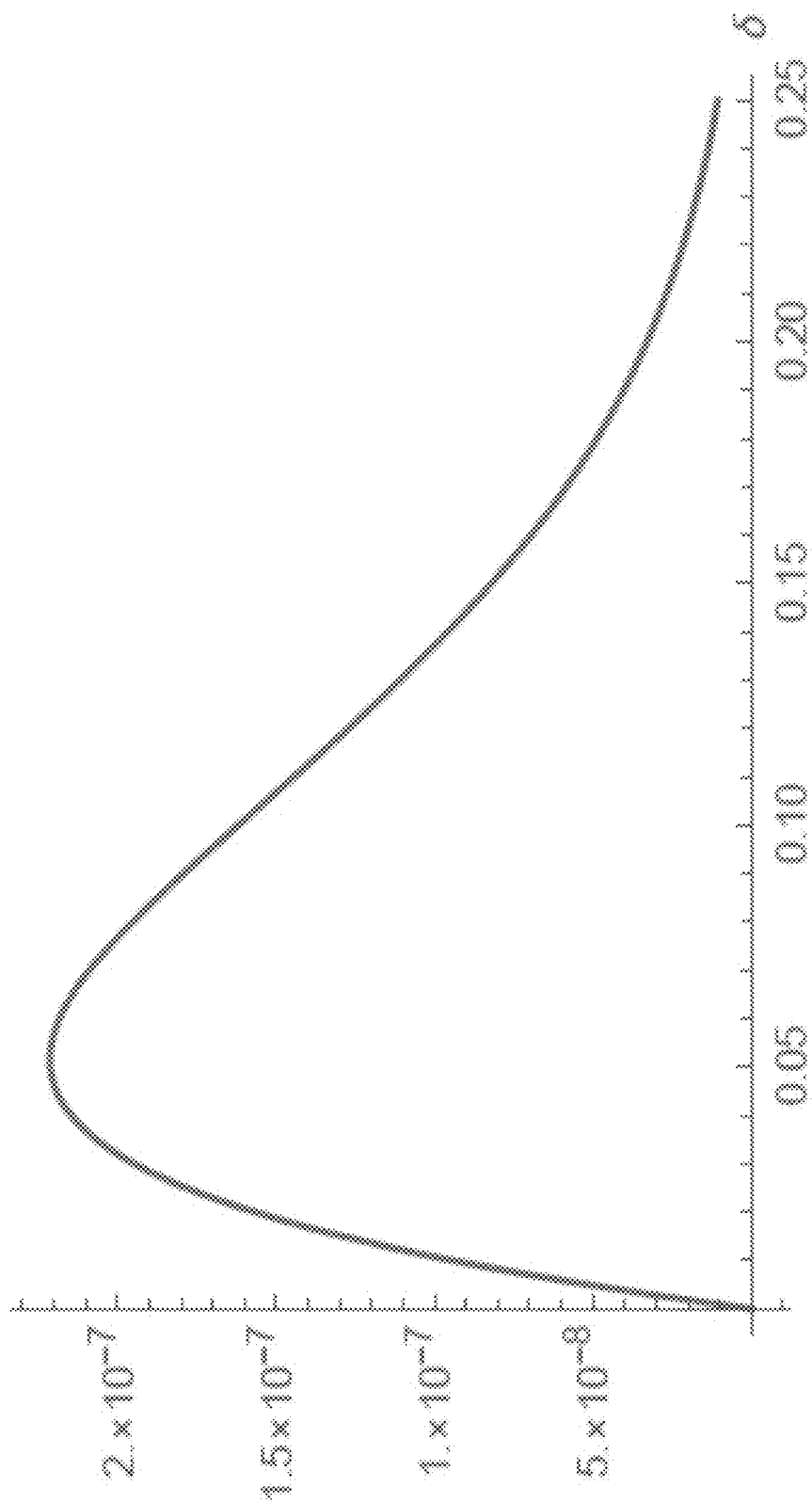
FIG. 12 is a plot of a theoretical worst case noise bound with $|x_N|=1$, R=1.1, N=7, $d_{min}=0.5$ over δ for a system implemented in accordance with an embodiment of the invention.

The minimal pairwise distance of the zeros is also called the zero separation. The number $\min_{\delta \in [0,d_{min}/2)} \varepsilon(|x_N|,R,N,d_{min},\delta)$ will determine an upper bound on the noise power for the worst combination of noise vector and polynomial in the class. A plot of (61) with $|x_N|=1$, $R=1.1$, $N=7$, $d_{min}=0.5$ over $\delta$ is shown in FIG. 12. By controlling the modulus of the noise polynomial $|W(z)| |X(z)|$ for $z \in C_m(\delta)$ one can predict with Rouche's Theorem for $\delta < d_{min}/2$, that the zero $\zeta_m$ of the perturbed polynomial will remain the only zero in the neighborhood $B_m(\delta)$. If this holds for all N zeros, then each zero will be distorted by less than S for a perturbation by w.

Since it is desirable for this to hold for every perturbation $\|w\|_2 \le \varepsilon$, ideally the following condition is satisfied $$\max_{\|w\|_2 \le \varepsilon} \max_{m=1,\ldots,N} \max_{z \in C_m(\delta)} |W(z)|^2 / |X(z)|^2 \le 1. \quad (62)$$

Note, that $X(z)$ has no zeros on $\cup C_m(\delta)$, hence division can be performed. Defining $\underline{z}=(z^0, z^1, \ldots, z^N)^T$, where $0^0$ is set to 1. An upper bound on the magnitude of $W(z)$ can be obtained by using Cauchy-Schwarz $$|W(z)|^2 = |w^T \underline{z}|^2 \le \|w\|_2^2 \cdot \|\underline{z}\|_2^2 = \varepsilon^2 \cdot \sum_{n=0}^N |z|^{2n}. \quad (63)$$

Since the noise w is in a ball with radius ε, all directions can be chosen and equality will be achieved in (63). Hence, (62) is equivalent to $$\varepsilon^2 \le \frac{1}{\max_m \max_{z \in C_m(\delta)} \frac{\sum_n |z|^{2n}}{|X(z)|^2}} = \quad (64)$$

$$\min_m \min_{z \in C_m(\delta)} \frac{|X(z)|^2}{\sum_n |z|^{2n}} = \min_m \min_\theta f_m(\theta)$$

where the parametrization $z=\alpha_m+\delta e^{i\theta}$ for some $\theta \in [0,2\pi)$ is used and defined $$f_m(\theta) := \frac{|X(\alpha_m+\delta e^{i\theta})|^2}{\sum_n |\alpha_m+\delta e^{i\theta}|^{2n}} = |x_N|^2 \frac{\prod_n |\alpha_m+\delta e^{i\theta}-\alpha_n|^2}{\sum_n |\alpha_m+\delta e^{i\theta}|^{2n}}. \quad (65)$$

A search for a uniform radius $\delta$ which keeps all root neighborhoods disjoint can be performed by searching for the worst $\alpha_m$. The only available information of the zeros is the minimal pairwise distance $d_{min}$ and the largest moduli $R>1$. By upper bounding the denominator with $\Sigma_n(R+\delta)^{2n} \le (1+N)(R+\delta)^{2N}$ and lower bounding the numerator with $\Pi_m |\alpha_n-\alpha_m|-\delta|^2$ the following expression is obtained $$\varepsilon \le |x_N| \frac{\delta(d_{min}-\delta)^{N-1}}{\sqrt{1+N}(R+\delta)^N} \le \min_m \min_\theta \sqrt{f_m(\theta)} \quad \square$$

Unfortunately, the bound (61) does not increases with $\delta$ for fixed $|x_N|$, N, R and $d_{min}$, see FIG. 12. By the continuity of the zeros this behavior is very unlikely and hence might be due to the worst case lower bound estimation in (61).

The observation can be made that as for general code constructions, only a finite number of good zero-pattern or codes are necessary to enable a reliable communication. The above theorem sheds some light on how to construct good zero patterns.

As can be seen from FIG. 12, a maximal zero separation provides good robustness. Since the maximal zero-separation of $X(z)$ is bounded from above by the maximal moduli $R=|\alpha_{max}| \ge d_{min}/2$ an increase of $d_{min}$ typically requires an increase of R. Setting $|\alpha_{max}|=td_{min}/2$ for some $t \ge 1$ results in $\varepsilon^2 \le |x_N|^2(t+1)^{-2N}/(1+N) \le 2^{-2N}/(1+N)$, which decreases exponentially in N. Hence this suggests to place zeros at the boundary of the ball to ensure the maximal possible $d_{min}$ and hence t close to 1. However, an increase of R means also a decrease of the leading coefficient, since it holds that $|\alpha_{max}| \leq 1 + \max_{k<N} |x_k/x_N|$. If x is normalized, the result yields $|\alpha_{max}| \leq 1 + |x_N|^{-1}$ and therefore $|x_N| \leq (|\alpha_{max}|-1)$ since $|\alpha_{max}| > 1$. Hence, if $R=|\alpha_{max}|$ increases, the leading coefficient has to decrease and $\varepsilon$ decreases rapidly for t=1. Therefore an arbitrary increasing of the radius seems not to be the solution.

Figure 13:
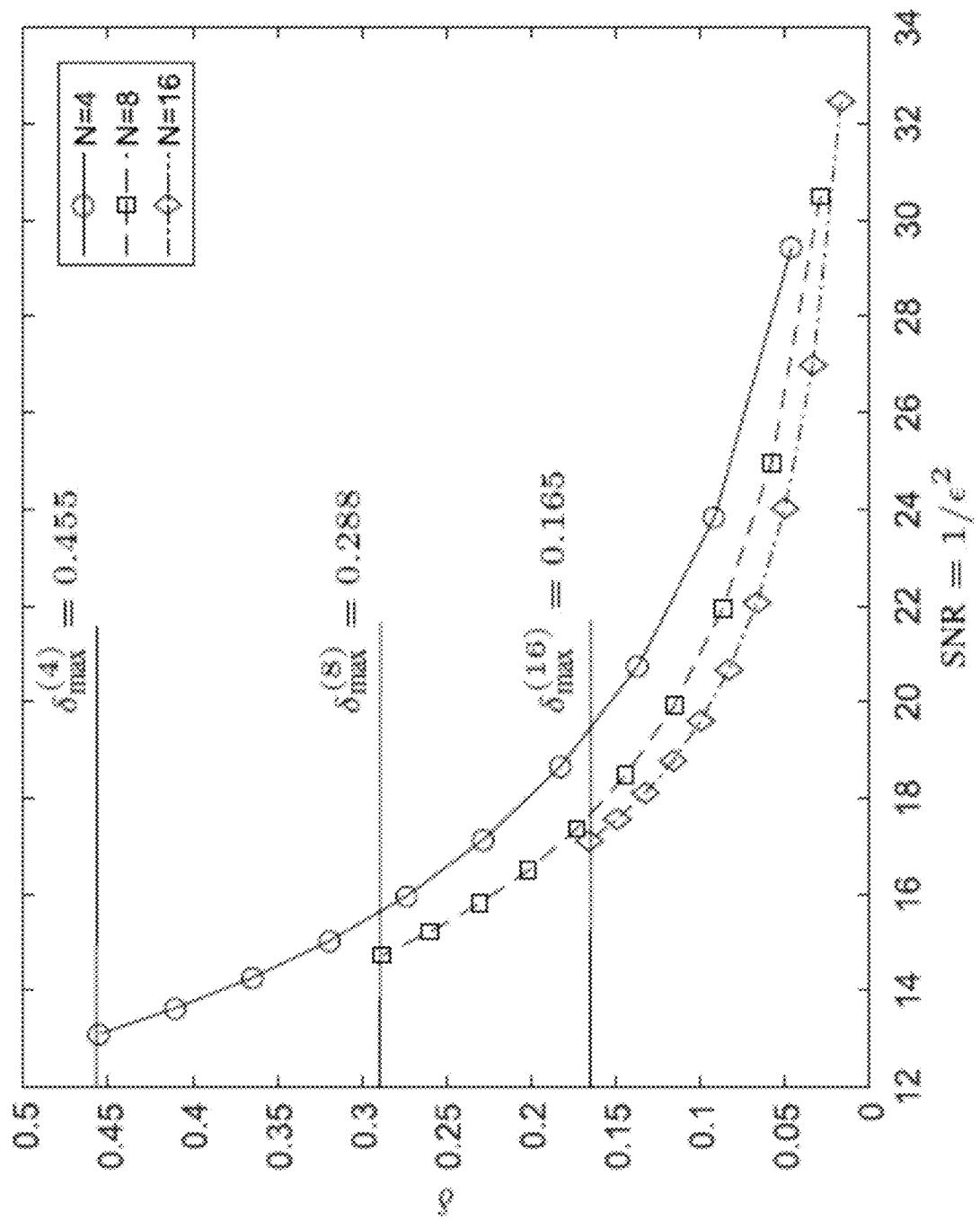
FIG. 13 is a plot showing the maximal root-neighborhood radius δ of Huffman polynomials over SNR for $R_{umi}(N)$ =1.5538; 1.3287; 1.1791 for a system implemented in accordance with an embodiment of the invention.

Since zeros of Huffman polynomials are placed on vertices of two regular polygons, they explore a large zero separation. Evaluating numerically the minimization problem for Huffman polynomials with fixed radius, by quantizing (65) with 1000 random error vectors, results in good noise bounds $1/\varepsilon$, as plotted in FIG. 13, which also suggests a better analytic bound for Huffman polynomials.

Figure 11A:
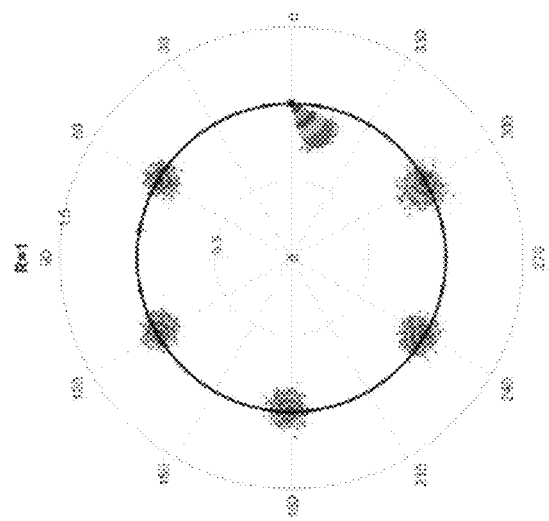
FIGS. 11A-11C are plots showing simulation of 7 SNR values in 22 dB-5 dB (darker color higher SNR) for a fixed Huffman sequence with K=6 zeros under free different radii implemented in accordance with an embodiment of the invention. For each SNR value 1000 different noise polynomials where generated.

In the case in which the zeros are bound on the unit circle (R=1), very good noise stability is obtained, as can be seen in FIG. 11A. It is known, that a polynomial with i.i.d. Gaussian distributed coefficients has zeros concentrated around the unit circle and is called a Kac polynomial. If the degree N goes to infinity, all zeros will be uniformly distributed on the unit circle with probability one. In fact, this even holds for other random polynomials with non Gaussian distributions. This is an important observation, since it implies for fixed K and hence R, that an increase of L will concentrate channel zeros on the unit circle, such that for sufficiently large R channel zeros will not interfere with codebook zeros.

The analysis of the stability radius for a certain zero-codebook and noise power, allows in principle an error detection for the RFMD decoder. Here, an error for the lth zero can only occur if the noise power is larger than the RHS of (61). However, in the presence of multipaths, the dimension N and $x_N \to x_K h_{L-1}$ can be adopted under the assumption that the absolute values of the zeros of H(z) are not larger than R. The minimal distance might be fulfilled with a certain probability.

Radius for Huffman BMOCZ Allowing Maximal Zern Separation

Figure 10:
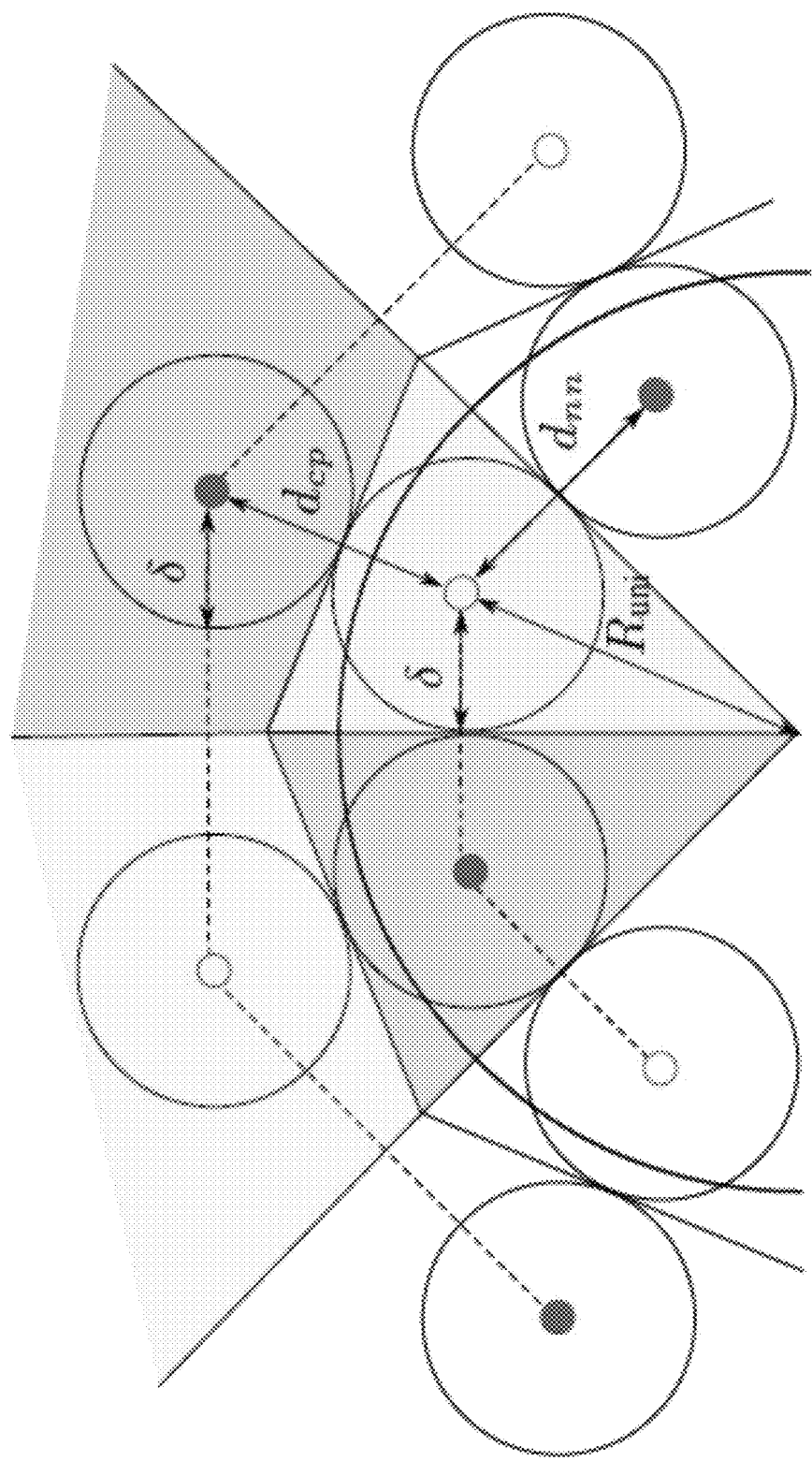
FIG. 10 conceptually illustrates the zero-patterns of the z-transform of a Huffman Binary Modulation On Conjugate-reciprocal Zeros (BMOCZ) scheme including their root-neighborhoods with radius S which allow a maximal zero separation $d_{min}$ in accordance with an embodiment of the invention.
Figure 11B:
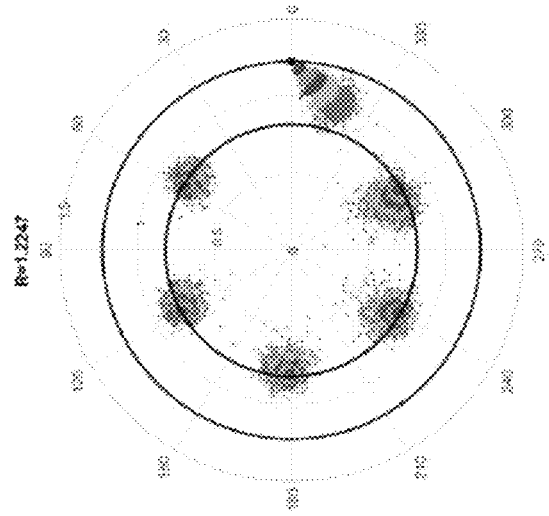
Figure 11C:
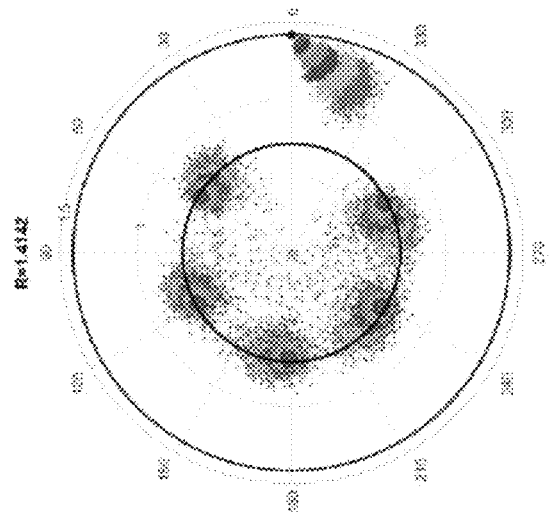

The preceding zero perturbation analysis and the numerical simulations in FIGS. 11A-11C for polynomials with zeros near the unit circle, show a zero distortion depending in first order linearly from the average coefficient perturbation and suggest therefore a quantization in decoding sets $\mathcal{D}_k$ with respect to the Euclidean distance. To prevent a confusion of a zero with its conjugate-reciprocal and their next-neighbor pairs, their Euclidean distances should be maximized. i.e., should be set equal $d_{cp}=(R-R^{-1})/2=R^{-1}\sin(\pi/K)=d_{nn}$, yielding to zero-patterns with maximal zero separation $d_{min}$, see FIG. 10. However, simulations of perturbed Huffman polynomials in FIGS. 11A-11C show a stronger phase distortion than radial distortion. To adjust the trade-off between radial and phase distance $\lambda \leq 1$ is introduced as a weight parameter $$\lambda d_{cp} = d_{nn} \Leftrightarrow \lambda(R^2-1) = 2\sin(\pi/K) \Rightarrow R_{uni}(K,\lambda) = \sqrt{1+2\lambda\sin(\pi/K)}. \quad (66)$$

Finding the optimal radius and hence the optimal Voronoi cells $\mathcal{D}_k$ is in fact a quantization problem. Note, that the zeros for Huffman BMOCZ are not the centroids of the Voronoi cells, which suggest a much more complex metric for an optimal quantizer. From simulation of the BER performance and the noise perturbation in FIGS. 11A-11C it can be observed that $\lambda \approx \frac{1}{2}$. It can also be seen from (22), that for $\lambda=\frac{1}{2}$ the first and last coefficients carry half of the energy. Note, that the positive zero $\alpha_1$ has a conic distortion. Simulation showed that the cone direction depends on the placement of the other N−1 zeros and on the number of zeros N. Hence, for uniform distributed messages the distortion for $\alpha_1$ will appear also circular.

PAPR for Huffman Sequences

From (22) the magnitudes of the first and last coefficients can be obtained $(1+R^{\pm 2K})^{-1}$, where the maximum is attained if $m \in \{0,1\}$, i.e., the all zero or all one bit message. By noting that their magnitude (22) exploits a symmetry for $2\|m\|_1$ and $K-2\|m\|_1$, an average need only be performed for uniform bit distributions over $\|m\|_1 \in \{0, \ldots, K/2\}$ (assuming K even), which gets $$\mathbb{E}[\|x\|_\infty^2] \frac{2^{-K/2}}{R^{2K}+1} \sum_{n=1}^{2^{K/2}} R^{-2\sum_{k=1}^{K/2} m_k^{(n)}} =$$

$$\frac{2^{-K/2}}{R^{2K}+1} \sum_{m=0}^{K/2} \binom{K/2}{m} R^{-2m} = \left(\frac{1+R^{-2}}{2}\right)^{\frac{K}{2}} \frac{1}{R^{2K}+1}.$$

Since the Huffman sequences have all unit energy, the peak-to-average-power ratio (PAPR) is for the optimal radius $R=R_{uni}(K,1)$ in (66) for large K $$PAPR = (K+1)\frac{\mathbb{E}\|x\|_\infty^2}{\mathbb{E}\|x\|_2^2} = \frac{(K+1)\left((1+R^{-1})/2\right)^{K/2}}{R^{2K}+1} \approx \frac{K+1}{(1+2\pi/K)^K+1}. \quad (67)$$

Upper bounding by $$\frac{K+1}{2+2\pi} \approx K/9$$

shows a well-known behavior for multi-carrier systems.

Numerical Simulations

Following the standard definition of SNR $$rSNR := \frac{\text{average received signal energy per symbol time}}{\text{average noise energy per symbol time}}. \quad (68)$$

A simulation was performed with MatLab 2017a of the bit-error-rate (BER) over average received SNR (3) and transmit energy/bit/noise-power $E_b/N_0$ for L independent Rayleigh fading paths with p=1/L in (2) and fixed transmission length N=K+L for all signaling schemes. Note, for BMOCZ, PPM, and Pilot-QPSK, we add a zero-guard interval of length L−1 to separate consecutive blocks, which is needed to enable multiple users or multiple transmissions. In all simulations, we set the transmit signal energy to E=N, such that the received average power $\mathbb{E}[\|x*h\|^2]/N=E/N=1$ (noise-free) will be normalized and equal to the average transmit power. Hence, the SNR=$1/N_0$ and the transmit energy per bit $E_b=N/B=R_b^{-1}$ is given as the inverse of the bit rate $R_b=B/N$ per sampling time T, such that $E_b/N_0=\text{SNR}/R_b$. In each simulation run, we draw a channel and noise realization by (2) and a uniformly binary message of length B for which we determined the number of bit errors. Averaging the resulting bit errors over all simulation runs obtain the uncoded BER over an averaged SNR respectively $E_b/N_0$.

As a benchmark, reference is made to the ideal coherent case, where an assumption is made of only one line-of-sight path (LOS) resulting in a flat-fading channel, using binary phase shift keying (BPSK) to modulate uncoded data.

Assuming knowledge of the channel phases at the receiver, coherent BPSK demodulation can be performed. As an equivalent, a cyclic prefix of length L can be added to exploit K+1 independent Rayleigh flat-fading channels in the frequency domain, where the frequency-symbols are modulated by BPSK and the power and delay overhead of the cyclic prefix is ignored. If L<<K this is a valid approximation that can be used in the classical OFDM approach, where long data packets are transmitted over time-invariant channels. The theoretical bit error probability (bit per symbol duration) for BPSK is known as $P_e = (1 - \sqrt{rSNR/(1+rSNR)})/2$.

Figure 14A:
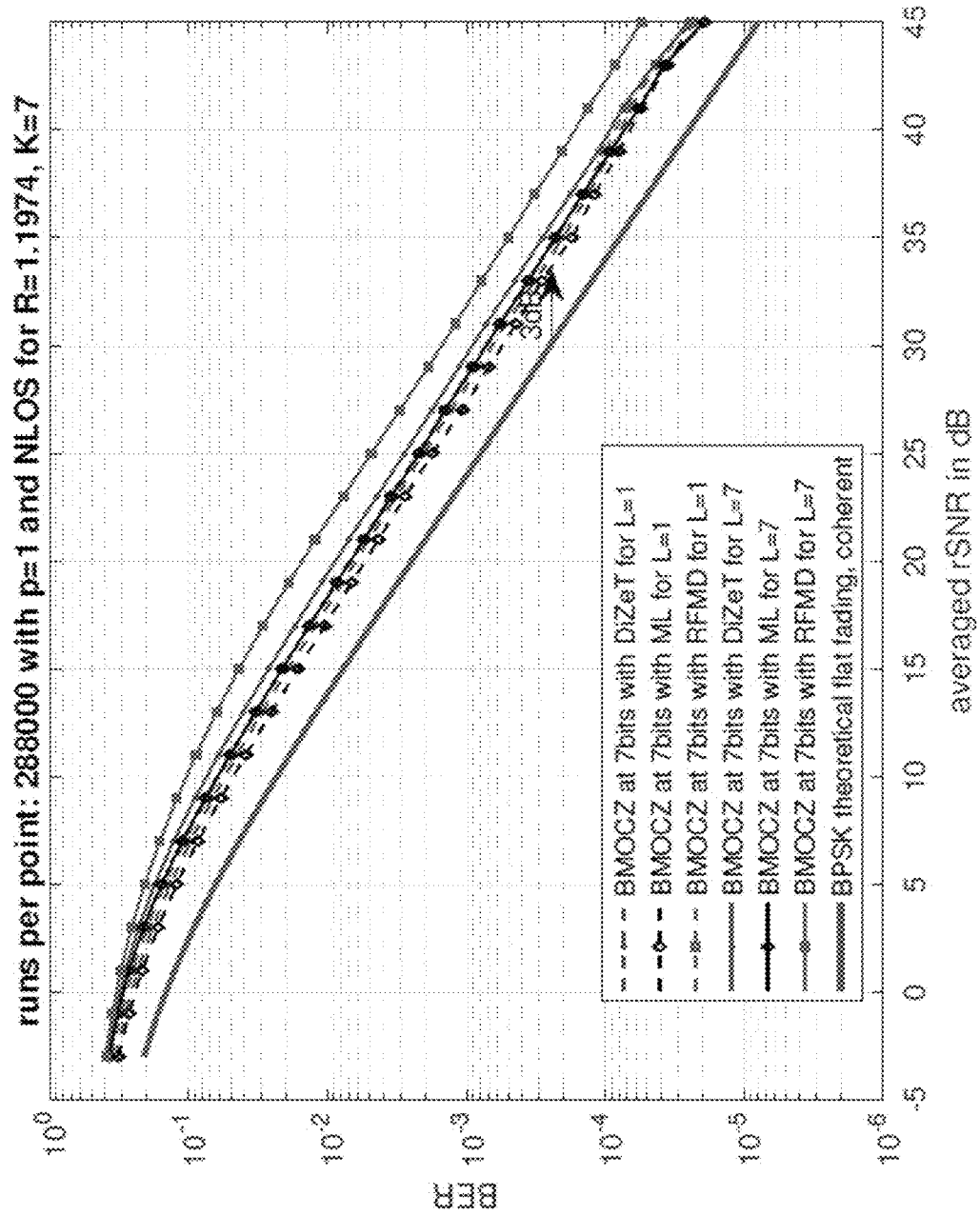
FIGS. 14A and 14B shows simulation results of BMOCZ for simulations performed with MatLab 2017a of the bit-error-rate (BER) over received SNR (3) and average energy/bit/noise-power $E_b/N_0$ for L independent Rayleigh fading paths for p=1 in (2) and fixed signal length K+1=8.
Figure 14B:
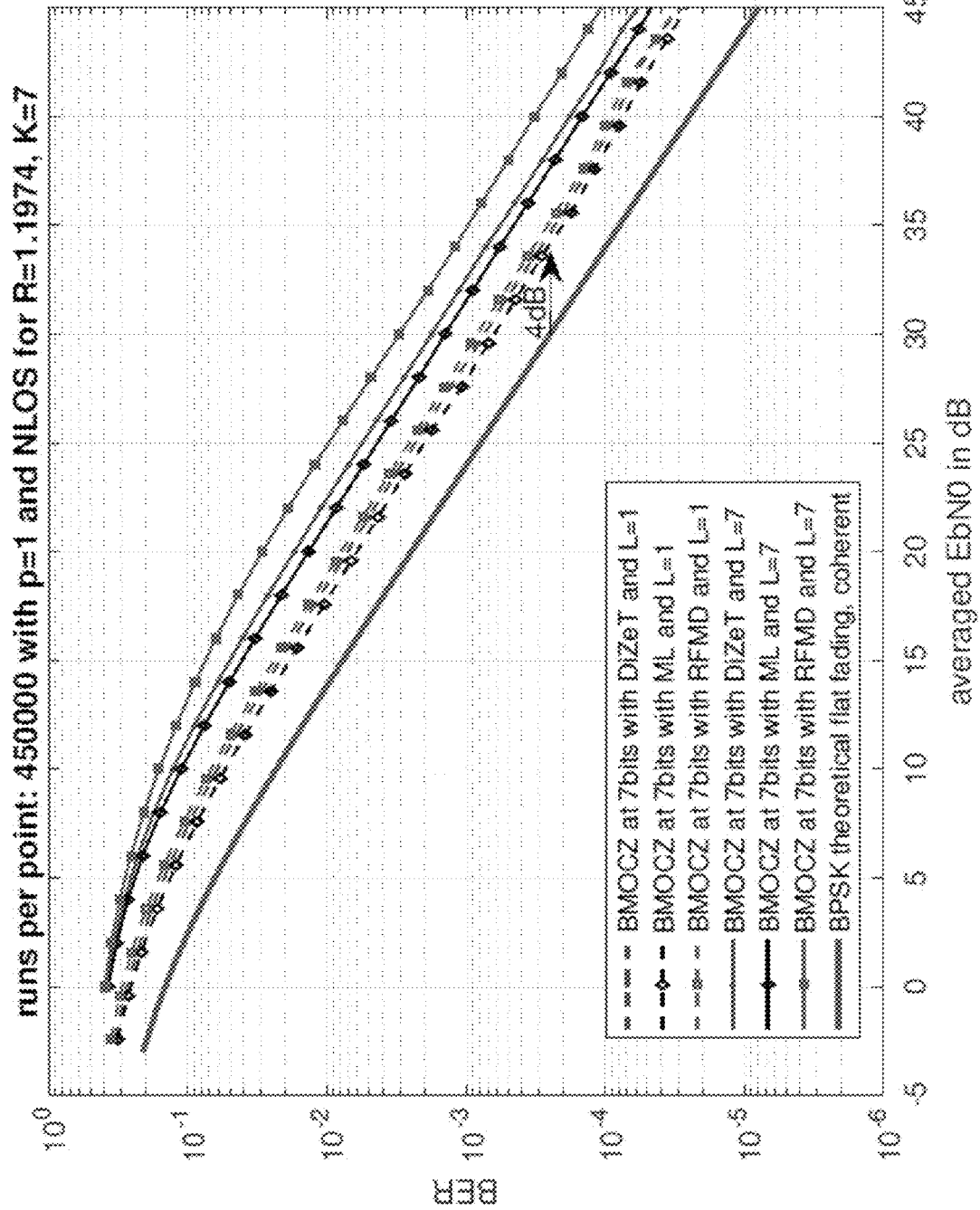

Since the rSNR is equal to $E_b/N_0 = E_b \mathbb{E}[|h_0|^2]/N_0$ the BPSK curves are the same over rSNR and $E_b/N_0$, pictured as thick red curves in FIGS. 14A and 14B and FIG. 8. BPSK modulation over a coherent flat fading channel can be seen as the optimal binary signaling performance if no channel state information is available at the transmitter or the receiver and no outer codes are used. Schemes above this line suffer from multipath and schemes below benefit from it.

A comparison between MOZ modulation schemes and noncoherent frequency-selective fading channels can be performed using simulations involving only one packet (block) in a sporadic pulse-like communication. The following discussion provides a comparison of MOZ to training, orthogonal, and so called self-coherent OFDM schemes. By using the same signal lengths for all schemes, plots were generated for a fixed target BER rate of 0.1 the corresponding $E_b/N_0$ over different channel lengths L in FIG. 15. Each data point is averaged over $>10^4$ different bit/channel/noise realizations. In all simulations, p=1 was used.

Comparison to Blind Schemes

The following presents a comparison between a MOZ scheme and a blind scheme, which will not estimate the channel, but directly decodes the data from the received signal. However, knowledge of the CIR length is required at the receiver and for OFDM also at the transmitter.

Noncoherent PPM with ML Decoder

The simplest noncoherent modulation scheme for multipath channels, is given by orthogonal signaling, where the transmitted discrete-time signals of the codebook $\mathscr{C}$ are mutually orthogonal. For the purpose of comparison a codebook is chosen in time-domain that is the Euclidean basis $\mathscr{C} = \{\delta_0, \ldots, \delta_K\} \subset \mathbb{C}^{K+1}$. The encoding of $D = \lfloor \log(K+1) \rfloor$ bits m is given by a K+1-ary pulse position modulation (PPM) as $$x = \delta_k \text{ with } k = \sum_{d=0}^{D-1} m_d 2^{D-1-d}. \tag{69}$$

Figure 15:
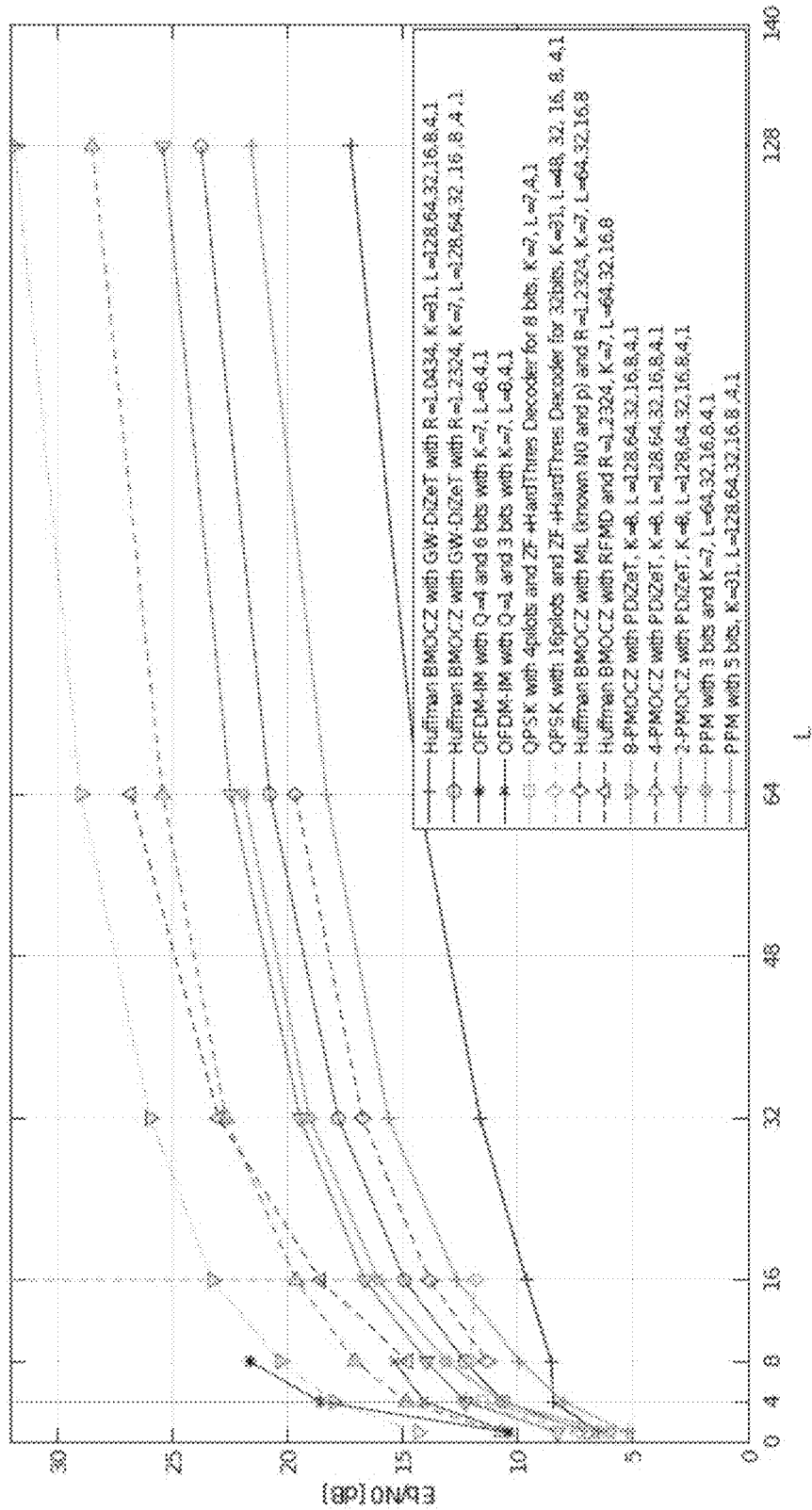
FIG. 15 is a simulation plot showing various blind modulation schemes for K=7 and K=31 which achieve a target BER of $10^{-1}$ at $E_b/N_0$ over various channel lengths L=1, 4, 8, 16, 32, 64, 128.

If $p_l$=const, for all L taps, the channel covariance matrix is a multiple of the identity and the ML decoder in (33) simplifies to $\hat{x} = \arg\max_{x \in \mathscr{C}} \|(X^*X)^{-1/2} X^* y\|_2^2$, which reduces to the square-law detector $\hat{k} = \arg\max_{k \in [M]} \sum_{l=0}^{L-1} |y_{l+k}|^2$ since $X^*X = I_L$. Although, orthogonal schemes can only encode log(K+1) bits instead of K bits as for BMOCZ, they enable a reliable data transmission for signal lengths less than the channel K≤L (no sparsity). In FIG. 15, it can be seen that indeed PPM (green curves) outperform BMOCZ (blue curves) in BER performance, but suffers much more from long CIRs than BMOCZ. For K=7 and L=64. BMOCZ is by 1 dB better than PPM, by simultaneously transmitting double the number of bits in the same time. For K=31 and L=32 the gap increases to 5 dB where at the same time the throughput for BMOCZ is 6 times higher than PPM (green curve, dot markers).

If the receiver has knowledge of instantaneous path gains (amplitude) or the PDP, an "optimal" path combiner can be exploited to obtain a better BER performance. Since MOZ schemes are fully blind, assuming knowledge of PDP is not a fair comparison.

Another disadvantage of PPM, is the need for a perfect synchronization between transmitter and receiver to identify the correct time-lags, a requirement which needs further resources. The time and frequency synchronizations can be handled very well for Huffman BMOCZ by using only a small fraction of bits to encode the payload in a rotation invariant code.

Noncoherent OFDM with IM

Index-Modulation (IM) techniques are one of the most recent and promising developments in wireless communication for 5G applications. The following discussion concentrates on a subcarrier (frequency) index-modulation which selects Q active carries out of K+1. For noncoherent OFDM-IM, as proposed in Choi, J., 2018. Noncoherent OFDM-IM and its performance analysis. *IEEE Transactions on Wireless Communications*, 17(1), pp. 352-360, the relevant disclosure from which is incorporated by reference herein in its entirety, the receiver will only detect the energies on each subcarrier and pick the Q largest (active) ones.

The active subcarrier combinations define a set of index sets $\{I_1, \ldots, I_M\} \subset [K+1]$, which can be sorted in a lexicographically order to map it in an efficient manner to bits. For Q>1 this yields to a codebook of size $$M = \binom{K+1}{Q}$$

and allows one to transmit $D = \lfloor \log M \rfloor$ bits per signal block.

By using factorial bounds, the largest codebook size for Q=(K+1)/2 can be bounded to $$M = \binom{K+1}{(K+1)/2} < \lfloor 2^{K - \log \sqrt{(K+1)/2}} \rfloor$$

which obtains for K>1 less than K−1 bits and therefore less than the proposed MOZ schemes. However, to enable OFDM a cyclic prefix (CP) of length L−1 is added to the data signal s, which results in an N=K+L dimensional transmit signal $x = (s_{K-(L-2)}, \ldots, s_K, s) \in \mathbb{C}^N$. This requires a data signal length K+1 of at least the channel length L, otherwise, the transmitted signal cannot be complemented with a CP and the channel action can not be written as a circular convolution. The circular convolution is then represented in the frequency domain by the FFT as a pointwise multiplication of K+1 independent flat-fading channels with the OFDM symbol $d = Fs \in \mathbb{C}^{K+1}$. To make a fair comparison to the BMOCZ scheme, the CP power is included in the transmit power. This reduces the effective power of x by a factor of up to two, if K≈L. Recall that $\mathbb{E}[\|s*h\|_2^2] = \|s\|_2^2 \cdot \mathbb{E}[\|h\|_2^2]$, see (3), and therefore $\mathbb{E}[\|h\|_2^2] = 1$ is enforced by dividing with the expected energy given by the PDP (4). However, the receiver will only use from the N+L−1 received samples K+1. i.e. $y = (y_{L-1}, \ldots, y_{N-1})$, $\tilde{w} = (w_{L-1}, \ldots, w_{N-1})$, to reveal the K+1 point circular convolution:

$$\tilde{y} = s \circledast \begin{pmatrix} h \\ 0_{K+1-L} \end{pmatrix} - \tilde{w} \Rightarrow \tilde{Y} = \quad (70)$$

$$F\left(s \circledast \begin{pmatrix} h \\ 0_{K+1-L} \end{pmatrix} + \tilde{w}\right) = \mathrm{diag}(d)F\begin{pmatrix} h \\ 0_{K+1-L} \end{pmatrix} + F\tilde{w}.$$

Note, $\tilde{Y}=F\tilde{y}$ are $K+1$ sample values of the z-transform of Y on the unit circle. In fact, the index set $I_m$ defines $K+1-Q$ zeros $\{e^{-j2\pi l/(K+1)} | l \in [K+1] \backslash I_m\}$ of the data polynomial $S_m(z) = \Sigma_{k=0}^K s_k z^k$ since $0 = d_l = \Sigma_k s_k \alpha_{m,l}^k$ with $\alpha_{m,l} = e^{-j2\pi l/(K+1)}$ for $l \in [K+1] \backslash I_m$. Hence, the mth OFDM-IM symbol $s_m$ generates a polynomial with $K+1-|I_m|$ zeros on the unit circle. If $Q=1$ then x generates a polynomial of order K with K zeros uniformly spaced on the unit circle with spacing $2\pi/(K+1)$, i.e. form the $K+1$ uniform positions on the unit circle we select K many. Hence, OFDM-IM can be seen as a special MOZ design defining K different zero-patterns $\alpha_1, \ldots, \alpha_K \subset \mathbb{C}^K$ by choosing K out of K+1 uniform placed zero positions on the unit circle. Since the various BMOCZ schemes described herein are not restricted to the unit circle a BMOCZ codebook size can be much larger. Let us note here, that this special case is only possible if $K \geq L$. Comparing the BER performance over $E_b/N_0$ in FIG. 15 for $K=7$ and various channel lengths $L \leq 8$, it can be seen that indeed BMOCZ outperforms OFDM-IM. Furthermore, the performance of OFDM-IM decreases if Q or L increases.

Comparison to Training Schemes

The most common approach in wireless communication, is to learn the CIR by placing known training or pilot data in the transmitted signals. Training is very efficient at high SNR and if the learned channel is used many times or equivalent if the signal length is much larger as the CIR. In a sporadic short-packet setup, this is typically not the case, and it can be shown that the overhead reduces the reliable throughput and prevents at a certain packet length a reliable communication at all.

As a simple pilot signaling scheme $x=[\delta_1, d]$ can be separated into a delta pilot $\delta_1 \in \mathbb{C}^P$ of length P and a data signal $d \in \mathbb{C}^{D=K-P}$ on the remaining taps to encode 2D bits per packet with QPSK modulation by allocating the available transmit power equally between pilot and data signals. Depending on the SNR and signal length it might be more beneficial to allocate more or less power to the pilots. But since the transmitter does not know the channel state or the SNR, the following discussion considers a blind allocation. The CIR estimation $\hat{h}$ is simply given by the first L received samples, assuming a perfect time synchronization and $p=1$. By using a Frequency-Domain-Equalization (FDE) receiver in the frequency domain, the estimated data is obtained by $$\hat{d} = F_N^* \left( F_N \begin{pmatrix} y_L \\ \vdots \\ y_{L+N-1} \end{pmatrix} / F_N \begin{pmatrix} \hat{h} \\ 0_{N-L} \end{pmatrix} \right) \Rightarrow \hat{d} = (\hat{d}, \ldots, \hat{d}_{D-1})^T. \quad (71)$$

which can be decoded by hard-thresholding of real and imaginary part.

$$\hat{m}_k = \frac{1}{2} + \frac{1}{2} \mathrm{sign}(\mathrm{Re}(\hat{d}_k)), \hat{m}_{k+L} = \frac{1}{2} + \frac{1}{2} \mathrm{sign}(\mathrm{Im}(\hat{d}_k)), k \in [D]. \quad (72)$$

To encode with enough pilots, knowledge of the maximal CIR length at the transmitter is typically required. If the pilot signal is too short (P<L), it is impossible to estimate exactly the channel, even in the noiseless case. As can be seen in FIG. 15 a scenario, where the transmitter assumes blindly a CIR length $\hat{L}=16$ (dashed yellow) by using P=16 pilots and D=16 QPSK data symbols (32 bits), where the receiver knows the true CIR length and will consider all N=P+D+L−1 taps. Here, the target BER=0.1 can not be achieved if the true channel length at the transmitter is underestimated (pictured by vertical lines), whereas BMOCZ only suffers slightly from an increased CIR length.

Multiple Receive Antennas

While the discussion and simulations described above have largely considered the case of a single transmitter and a single transmitter. Communications that include MOZ schemes can incorporate multiple transmitters and/or multiple receivers in accordance with various embodiments of the invention. If the receiver has M antennas, receive antenna diversity can be exploited, since each antenna will receive the MOCZ symbol over an independent channel realization (best case).

Due to the short wavelength in the mmWave band large antenna arrays can be easily installed on small devices. The DiZeT decoder and channel estimation techniques described above can be implemented in a straight forward single-input-multiple-output SIMO antenna system. A number of simulations of such a SIMO system are presented below and it is assumed in these simulations that:

The B information bits $m \in \mathbb{F}_2^B$ are drawn uniformly.

All signals arrive with the same timing-offset $\tau_0$ at the M receive antennas. (dense antenna array, fixed relative antenna positions (no movements))

The maximal CIR length L, sparsity level S, and PDP p are the same for all antennas.

Each received signal experience an independent noise and channel realization, with random Sparsity pattern $s_m \in \{0, 1\}^L$ with $|\mathrm{supp}(s_m)|=S$ CIR $h_m \in \mathbb{C}^L$ where $h_{m,l} = \mathcal{CN}(0, s_{m,l} p^l)$ for $l \in [L]$.

Although the present invention has been described in certain specific aspects, many additional modifications and variations would be apparent to those skilled in the art. It is therefore to be understood that the present invention can be practiced otherwise than specifically described including communication systems that are SISO, SIMO, MIMO, massively MIMO, and/or that employ binary MOZ, binary MOCZ, M-ary MOZ, and/or M-ary MOCZ. Thus, embodiments of the present invention should be considered in all respects as illustrative and not restrictive. Accordingly, the scope of the invention should be determined not by the embodiments illustrated, but by the appended claims and their equivalents.

What is claimed is:

1. A combined radar and wireless communication system, comprising:
  a transmitter configured to transmit a continuous-time signal, comprising:
    a modulator configured to modulate a plurality of bits to obtain a discrete-time baseband signal that is a Huffman sequence selected from a codebook comprising a plurality of Huffman sequences; and
    a signal generator configured to generate the continuous-time signal based upon the discrete-time baseband signal;
  a receiver, comprising:
    a demodulator configured to sample a received continuous-time signal at a given sampling rate; and
    a decoder configured to decode a plurality of received information bits from the samples of the received signal using the codebook;

wherein the transmitter further comprises a radar receiver configured to receive a reflection of the continuous-time signal and perform detection and ranging based upon impulsive autocorrelation of the selected Huffman sequence.

2. The combined radar and wireless communication system of claim 1, wherein:
the z-transform of the discrete-time baseband signal comprises a zero for each of the plurality of bits;
each zero in the z-transform of the discrete-time baseband signal is limited to being one of a set of conjugate-reciprocal pairs of zeros; and
the conjugate reciprocal pair of zeros in the set of conjugate-reciprocal pairs of zeros are uniformly placed on two circles:
an outer circle having a radius greater than one; and
an inner circle having a radius that is the reciprocal of the first radius.

3. The combined radar and wireless communication system of claim 2, wherein the decoder is configured to decode the plurality of decoded information bits by:
determining a plurality of zeros of a z-transform of a received discrete-time baseband signal based upon samples from the received continuous-time signal;
identifying zeros from the plurality of zeros that correspond to information bits; and
outputting the plurality of received information bits based upon the identified zeros.

4. The combined radar and wireless communication system of claim 3, wherein the plurality of zeros of the z-transform of the received discrete-time baseband signal comprise a plurality of zeros that correspond to information bits and at least one zero introduced by multipath propagation of the transmitted signal.

5. The combined radar and wireless communication system of claim 3, wherein the decoder is configured to determine the most likely set of zeros for the z-transform of the discrete-time baseband signal used to generate the transmitted signal based upon the samples of the received continuous-time signal.

6. The combined radar and wireless communication system of claim 3, wherein the codebook is an autocorrelation codebook.

7. The combined radar and wireless communication system of claim 3, wherein the decoder determines the decoded information bits by performing a weighted comparison of samples of the z-transform of the received discrete-time baseband signal with each zero in a set of zeros.

8. The combined radar and wireless communication system of claim 1, wherein the decoder performs a weighted comparison using an inverse discrete Fourier transform of delayed and weighted samples of the received continuous-time signal.

9. The combined radar and wireless communication system of claim 1, wherein the receiver is configured to estimate characteristics of a channel over which the received continuous-time signal was transmitted.

10. The combined radar and wireless communication system of claim 1, wherein:
the receiver comprises a plurality of receive antennas; and
the decoder determines the decoded information bits based upon a plurality of continuous-time signals received by the plurality of receive antennas.

11. The combined radar and wireless communication system of claim 1, wherein the continuous-time transmitted signal comprises a carrier frequency modulated based upon the discrete-time baseband signal.

12. The combined radar and wireless communication system of claim 1, wherein the demodulator comprises an analog to digital converter.

13. A combined radar and wireless communication system, comprising:
a transmitter configured to transmit a continuous-time signal, comprising:
a modulator configured to modulate a plurality of bits to obtain a discrete-time baseband signal that is a Huffman sequence; and
a signal generator configured to generate the continuous-time signal based upon the discrete-time baseband signal;
a radar receiver configured to receive a reflection of the continuous-time signal and perform detection and ranging based upon impulsive autocorrelation of the Huffman sequence;
wherein the continuous-time transmitted signal comprises a carrier frequency modulated signal based upon the discrete-time baseband signal.

14. The combined radar and wireless communication system of claim 13, wherein:
the z-transform of the discrete-time baseband signal comprises a zero for each of the plurality of bits;
each zero in the z-transform of the discrete-time baseband signal is limited to being one of a set of conjugate-reciprocal pairs of zeros; and
the conjugate reciprocal pair of zeros in the set of conjugate-reciprocal pairs of zeros are uniformly placed on two circles:
an outer circle having a radius greater than one; and
an inner circle having a radius that is the reciprocal of the first radius.

15. The combined radar and wireless communication system of claim 13, wherein modulator is configured to select the Huffman sequence from a codebook comprising a plurality of Huffman sequences based upon the plurality of bits.

16. The combined radar and wireless communication system of claim 13, wherein the modulator is configured to modulate the plurality of bits to obtain the discrete-time baseband signal using a lookup mechanism.

17. A combined radar and wireless communication system, comprising:
a transmitter configured to transmit a continuous-time signal, comprising:
a modulator configured to modulate a plurality of bits to obtain a discrete-time baseband signal; and
a signal generator configured to generate the continuous-time signal based upon the discrete-time baseband signal;
a radar receiver configured to receive a reflection of the continuous-time signal and perform detection and ranging based upon impulsive autocorrelation with the discrete-time baseband signal;
wherein the z-transform of the discrete-time baseband signal comprises a zero for each of the plurality of bits;
wherein each zero in the z-transform of the discrete-time baseband signal is limited to being one of a set of conjugate-reciprocal pairs of zeros;
wherein the conjugate reciprocal pair of zeros in the set of conjugate-reciprocal pairs of zeros are uniformly placed on two circles:
an outer circle having a radius greater than one; and
an inner circle having a radius that is the reciprocal of the first radius; and wherein the continuous-time transmitted signal comprises a carrier frequency modulated signal based upon the discrete-time baseband signal.

18. The combined radar and wireless communication system of claim 17, wherein:
the discrete time-baseband signal is a Huffman sequence; and
the modulator is configured to select the Huffman sequence from a codebook comprising a plurality of Huffman sequences based upon the plurality of bits.

19. The combined radar and wireless communication system of claim 17, wherein the modulator is configured to modulate the plurality of bits to obtain the discrete-time baseband signal using a lookup mechanism.

* * * * *